US006732595B2

(12) United States Patent
Lynnworth

(10) Patent No.: US 6,732,595 B2
(45) Date of Patent: May 11, 2004

(54) METHOD OF AND SYSTEM FOR DETERMINING THE MASS FLOW RATE OF A FLUID FLOWING IN A CONDUIT

(75) Inventor: Lawrence C. Lynnworth, Waltham, MA (US)

(73) Assignee: Panametrics, Inc., Waltham, MA (US)

( * ) Notice: Subject to any disclaimer, the term of this patent is extended or adjusted under 35 U.S.C. 154(b) by 46 days.

(21) Appl. No.: 10/260,331

(22) Filed: Sep. 30, 2002

(65) Prior Publication Data

US 2004/0011141 A1 Jan. 22, 2004

Related U.S. Application Data

(60) Provisional application No. 60/396,677, filed on Jul. 18, 2002.

(51) Int. Cl.$^7$ ................................................. G01F 1/66
(52) U.S. Cl. ................................................. 73/861.27
(58) Field of Search ........................ 73/861.18, 861.27, 73/861.26, 861.28, 861.29, 861.31, 861.25, 861.3

(56) References Cited

U.S. PATENT DOCUMENTS

| | | |
|---|---|---|
| 3,564,912 A | 2/1971 | Malone et al. |
| 3,731,532 A | 5/1973 | Courty |
| 4,300,401 A | 11/1981 | Pedersen |
| 4,596,133 A | 6/1986 | Smalling et al. |
| 4,893,496 A | 1/1990 | Bau et al. |
| 5,159,838 A | 11/1992 | Lynnworth |
| 5,272,060 A | 12/1993 | Hamamoto et al. |
| 5,437,194 A | 8/1995 | Lynnworth |
| 5,456,114 A | 10/1995 | Liu et al. |
| 5,515,733 A | 5/1996 | Lynnworth |
| 5,962,790 A | 10/1999 | Lynnworth et al. |
| 6,047,602 A | 4/2000 | Lynnworth |
| 6,343,511 B1 | 2/2002 | Lynnworth et al. |

OTHER PUBLICATIONS

Spitzer, D. W. (Editor), *Flow Measurement–Practical Guides For Measurement Control*, Second, Ed. ISA (2001), Chapter 20, pp 515–573, Ultrasonic Flow Meters, by Brown, A. E. and Lynnworth, L.C.

*Ultrasonic Measurements for Process Control–Theory, Techniques, Applications*, Chapter 6, pp. 423–447 Academic Press (1989).

Rao, M.R., *A Realtion Between Velocity of Sound in Liquids and Molecular Volume*, Indian J. Physics, vol. 14, pp 109–116 (1940).

Jed Matson, Charles F. Mariano, Oleg Khrakovsky, Larry Lynnworth, *Ultrasonic Mass Flowmeters Using Clamp–On or Wetted Transducers*, Proc. 5th Internationa Symposium Fluid Flow Measurement ISFFM (Apr. 2002), pp 1–12 including NIST data pp. 11–12.

Lynnworth, L.C., and Magori, V., Papadakis, E.P. (Editor), *Physical Acoustics*, vol. 23, Academic Press (1999), p. 388.

Scarrot, G.G. and Naylor, R., *Wire Type Acoustic Delay Lines for Digital Storage*, Proc. IEE 103B (Suppl. 3), pp. 497–508 (1956).

(List continued on next page.)

Primary Examiner—Edward Lefkowitz
Assistant Examiner—Jewel Thompson
(74) Attorney, Agent, or Firm—Iandiorio & Teska

(57) ABSTRACT

A method of and system for analyzing the mass flow rate of a fluid flowing in a conduit wherein ultrasonic energy is transmitted along multiple v paths in multiple parallel quadrature planes through the fluid, the transit time of the ultrasonic energy through the fluid with and against the flow direction of the fluid is measured, and the flow velocity of the fluid in each quadrature plane is calculated based on the transit time in each quadrature plane. The density of the fluid in each quadrature plane is then determined and quadrature integration of the product of the fluid density and fluid velocity in each quadrature plane is performed to calculate the total mass flow rate of the fluid more accurately by eliminating errors associated with assuming that the density of the fluid in the conduit is uniform.

33 Claims, 11 Drawing Sheets

OTHER PUBLICATIONS

Wiedemann (described in Brockelsby, C.F.; Palfreeman, J.S. and Gibson, R.W., Ultrasonic Delay Lines, Iliffe Books LTD (1963) pp. 134–138, 140.

Andreatch, P., Jr. and Thurston, R.N., *J. Acous. Soc. Am.* 29 (1) pp. 16–19 (Jan. 1957).

Shepard, C.L., Burghard, B.J., Friesel, M.A., Hildebrand, B., Moua, X. Diaz, A. A. and Enderlin, C.W., *Measurements of Density and Viscosity of One–and Two–Phase Fluids with Torsional Waveguides*, IEEE UFFC, vol. 46 No. 3, (May 1999) pp. 536–548, references 5–9.

Jin O. Kim, Haim H. Bau, Yi Liu, Member, IEEE, Lawrence C. Lynnworth, Fellow, IEEE, Steven A. Lynnworth, Kimberly A. Hall, Saul A. Jacobson, *Member, IEEE*, James A. Korba, Robert J. Murphy, Michael A. Strauch, and Kyle G. King, *Torsional Sensor Applications in Two–Phase Fluids*, IEEE Transactions on Ultrasonics, Ferroelectrics, and Frequency Control, vol. 40, No. 5., Sep. 1993, pp 563–576.

Jin O. Kim and Haim H. Bau, *On line, real–time densimeter —Theory and optimization*, J. Acoust. Soc. Am. 85 (1), Jan. 1989, pp 432–439.

Jin O. Kim and Haim H. Bau, *Instruments for simultaneous measurement of density and viscosity*, Rev. Sc. Instrum. 60 (6), Jun. 1989, pp 1111–1115.

Jin O. Kim, Yuhou Wang, and Haim H. Bau, *The effect of an adjacent viscous fluid on the transmission of torsional stress waves in a submerged waveguide*, J. Accoust. Soc. Am. 89 (3), Mar. 1991. pp 1414–1422.

Haim H. Bau, *Torsional Wave Sensor—A Theory*, Journal of Applied Mechanics, vol. 108, Dec. 1986, pp 846–848.

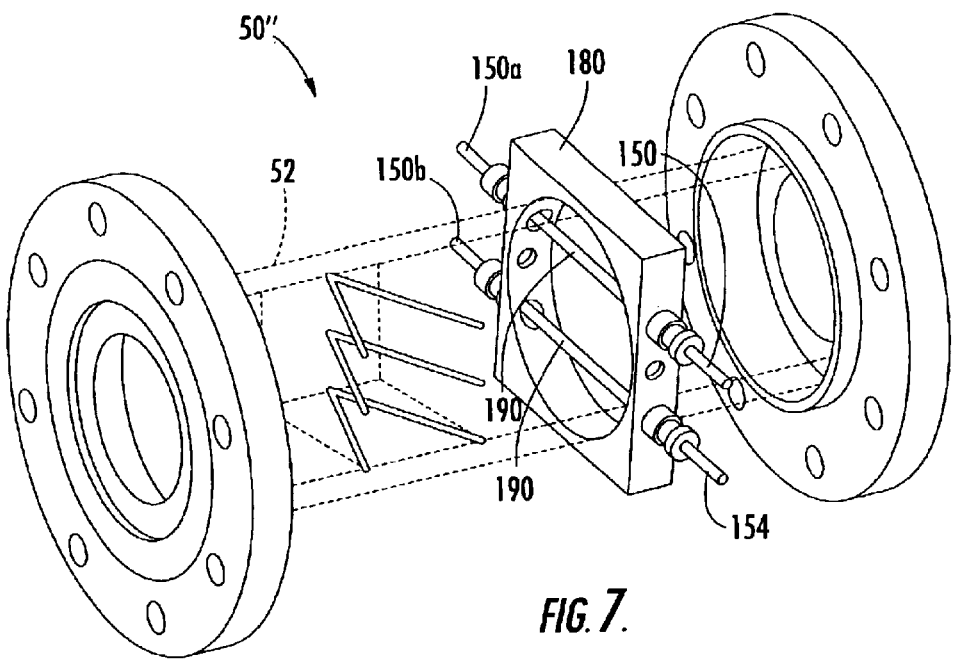
FIG. 7.
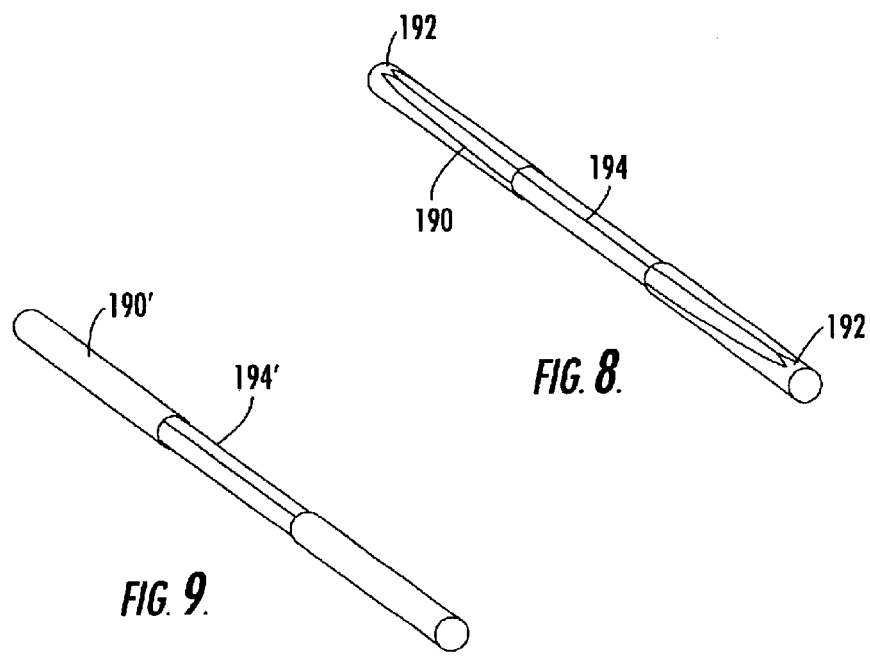
FIG. 8.
FIG. 9.

METHOD OF AND SYSTEM FOR DETERMINING THE MASS FLOW RATE OF A FLUID FLOWING IN A CONDUIT

PRIORITY CLAIM

This application claims priority of U.S. Provisional Application Serial No. 60/396,677 filed Jul. 18, 2002.

FIELD OF THE INVENTION

This invention relates to a high-accuracy quadrature multipath mass flow meter system and method for measuring mass flow rate.

BACKGROUND OF THE INVENTION

Quadrature multipath mass flow meter systems are used to fairly accurately determine the total mass flow rate of a fluid flowing in a conduit using quadrature integration of the product of the average fluid density $\rho_{avg}$ and the measured fluid velocity in each quadrature plane. See U.S. Pat. Nos. 3,564,912; 5,515,733; 6,047,602; and 4,300,401 incorporated herein by this reference.

In the prior art, the fluid velocities $V_1$, $V_2$, and $V_3$ (assuming 3 parallel quadrature planes) are calculated using ultrasonic transducers which detect the transit times of ultrasonic pulses transmitted bidirectionally through the fluid in each of the three quadrature planes. The fluid velocities in each quadrature plane are then computed as a function of the transit times of the ultrasonic energy both with and against the direction of the flow. The transit times themselves are principally a function of the paths and the speed of sound in the fluid which, in turn, is a function of the density of the fluid. Factors which influence sound speed, other than density, are dealt with below. Once the fluid velocities are calculated, quadrature integration is used to calculate the volumetric flow rate Q. if density were uniform, one could calculate the fluid's mass flow rate based on the products $\rho_{avg}V_1$, $\rho_{avg}V_2$, and $\rho_{avg}V_3$. In this case, the average density of the fluid $\rho_{avg}$ is measured, calculated, or assumed based on the fluid composition and conditions if it is known.

In many situations, however, the assumption that the density of the fluid in the conduit is uniform is erroneous. Temperature variations, elbows in the conduit (which act like centrifuges), and other factors can result in non-uniform density distributions in the conduit.

To illustrate the error associated with assuming that the density of the fluid in the conduit is uniform when in fact the density is different in each quadrature plane, suppose (using consistent units) that $V_1=3$, $V_2=7$, and $V_3=9$ and the density is assumed to be uniform and of numerical value $\rho_{avg}=5.3$. The average velocity is 6.33 and so the product of the averages is 33.5. But, if in reality the density is non-uniform such that the density of the fluid in each quadrature plane is different, for example, $\rho_1=2$, $\rho_2=6$, $\rho_3=8$, then the average density is still 5.3, but the average of the products is now $(\rho_1V_1+\rho_2V_2+\rho_3V_3)/3=40$, not 33.5. Thus, using an average density and assuming the density is uniform when it is not generally results in an erroneous total mass flow rate calculation. This error occurs despite using quadrature integration or other methods which are generally perceived to yield accurate volumetric flow rate Q, and generally further assumed to yield an accurate mass flowrate when Q is multiplied by an average value for density, with density typically computed based on point measurement of temperature in the fluid and pressure measured near the wall of the conduit.

Such an error can be extremely important in many industries including the use of mass flow rate systems to determine the price to be paid for expensive commodities such as oil or even water.

SUMMARY OF THE INVENTION

It is therefore an object of this invention to provide a more accurate quadrature multipath mass flow meter system and method.

It is a further object of this invention to provide such a system and method which is accurate to within 0.5–1% in general industrial process control situations, and 0.25 to 0.5% in custody transfer applications.

It is a further object of this invention to provide such a system and method which reduces the error associated with the prior art wherein the density of the fluid (liquid or gas, or some multiphase mixtures) was assumed to be uniform.

It is a further object of this invention to provide such a system and method which can be used in cases where the density of the fluid varies within a conduit.

The invention results from the realization that a more accurate quadrature multipath mass flow meter system and method especially useful in connection with fluid flows having non-uniform density distributions is effected by not by taking the product of the average fluid density and the volumetric flowrate Q determined by quadrature integration of the fluid velocities in each quadrature plane, but, instead, by quadrature integration of the product of the fluid densities and the fluid velocities in each quadrature plane, to calculate the total mass flow rate of the fluid. The new method is more accurate because it a) eliminates errors associated with assuming that the density of the fluid in the conduit is uniform, or b) eliminates the errors associate with multiplying an accurate Q by an average density of an acknowledged or known density gradient and taking that "product of the averages" to be the mass flowrate.

This invention features a method of analyzing and determining the mass flow rate of a fluid flowing in a conduit, the method comprising transmitting ultrasonic energy along multiple "v paths" in multiple parallel quadrature planes through the fluid, measuring the transit time of the ultrasonic energy through the fluid with and against the flow direction of the fluid, calculating the flow velocity of the fluid in each quadrature plane based on the transit time in each quadrature plane, determining the density of the fluid in each quadrature plane, and performing quadrature integration of the product of the fluid density and fluid velocity in each quadrature plane to calculate the total mass flow rate of the fluid more accurately by eliminating errors associated with assuming that the density of the fluid in the conduit is uniform.

In one embodiment, the density is determined in each quadrature plane by calculating the speed of sound in each quadrature plane from the transit time of the ultrasonic energy through the fluid in each quadrature plane and referencing a library including speed of sound and density data for different fluids.

In other embodiments, the density of the fluid is determined by measuring the density of the fluid. In one example, the density of the fluid in each quadrature plane is measured by transmitting ultrasonic energy as a torsional wave in a waveguide sensor located in each of the quadrature planes, measuring the transit time of the ultrasonic energy in the fluid, and calculating the density of the fluid in each quadrature plane based on the transit time in each quadrature plane. In another example, the density of the fluid in a first quadrature plane is measured by transmitting ultrasonic energy in the first quadrature plane, measuring the transit time of the ultrasonic energy in the fluid in the quadrature plane, calculating the density of the fluid in the first quadrature plane based on the transit time of the ultrasonic energy in the first quadrature plane, and deriving, using Rao's rule, for example, the density of the fluid in the other quadrature planes from the measured density of the fluid in the first quadrature plane.

Typically, for the fluid velocity measurements, the ultrasonic energy is transmitted across each quadrature plane and then reflected back across each quadrature plane, and the parallel quadrature planes extend horizontally.

Further included may be the steps of measuring the temperature and pressure of the fluid and calculating the mass flow rate using the temperature and pressure measurements.

In still another example, the speed of sound is calculated based on the transit time of the ultrasonic energy through the fluid and the density of the fluid in each quadrature plane is determined using the calculated speed of sound in each quadrature plane.

A higher accuracy quadrature mass flow meter in accordance with this invention features a first set of ultrasonic transducers aligned to transmit ultrasonic energy along multiple paths in multiple parallel quadrature planes through a fluid flowing in a conduit, a second set of ultrasonic transducers aligned in the quadrature planes to receive the ultrasonic energy transmitted by the first set, means for determining the density of the fluid in each quadrature plane, and an electronic subsystem responsive to the ultrasonic transducers and the means for determining density, the electronic subsystem configured to calculate the flow velocity of the fluid in each quadrature plane based on the transit time of the transmitted ultrasonic energy in each quadrature plane, the electronics subsystem including a processor programmed to perform quadrature integration of the product of the fluid density and fluid velocity in each quadrature plane and to calculate the total mass flow rate of the fluid.

In one embodiment, the means includes a memory including speed of sound and density data for different liquids and the processor is configured to calculate the speed of sound in each quadrature plane from the transit time of the transmitted ultrasonic energy through the fluid in each quadrature plane, and to compare the calculated speed of sound in each quadrature plane with the data in the memory to determine the density of the fluid in each quadrature plane.

In another embodiment, the means includes a third plurality of ultrasonic transducers located downstream from the second plurality of transducers and also aligned with the quadrature planes and configured to transmit ultrasonic energy in the fluid. In this embodiment, the processor is programmed to calculate the density of the fluid in each quadrature plane based on the transit time of the ultrasonic energy in the fluid transmitted by the third plurality of transducers. Typically, the third plurality of transducers are each configured to launch a torsional wave in an acoustic waveguide in the fluid, and the third plurality of transducers each include a waveguide extending through the conduit.

In another embodiment, the density measuring means includes a single ultrasonic transducer located downstream from the second plurality of transducers aligned with a first quadrature plane and configured to transmit ultrasonic energy in a waveguide sensor in the fluid in said first quadrature plane. The processor is then programmed to calculate the density of the fluid in the first quadrature plane based on the transit time of the ultrasonic energy in the sensor portion of the waveguide immersed in the fluid transmitted by the single ultrasonic transducer and to derive the density of the fluid in the other quadrature planes based on the calculated density of the fluid in the first quadrature plane using, for example, Rao's rule.

In one example, the conduit is a spoolpiece including all of the transducers disposed therein and coupled or installed between two conduit sections. Typically, the parallel quadrature planes extend horizontally, the first and second set of ultrasonic transducers are located on the same side of the conduit, and a set of reflectors are disposed on the opposite side of the conduit between the first and second set of ultrasonic transducers for redirecting ultrasonic energy from one set of transducers to the other. Also, the quadrature planes are typically perpendicular to a transverse axis of the conduit. In one specific example, each ultrasonic transducer is installed in a fitting located in an insert attached to the conduit, and the insert forms a truncated cone whose vertex is coincident with intersection of the longitudinal axis of the insert and the interior wall of the conduit.

Further included may be temperature and pressure sensors for detecting temperatures and pressure of the fluid in the conduit. Also, it may be preferable that the first and second sets of transducers are aligned such that all of the ultrasonic energy interactions with the fluid occur in a volume defined by planes at the end of a cube inscribed in the conduit.

BRIEF DESCRIPTION OF THE DRAWINGS

Other objects, features and advantages will occur to those skilled in the art from the following description of a preferred embodiment and the accompanying drawings, in which:

FIG. 7 is a schematic three-dimensional view showing a portion of another example of a mass flow rate system in accordance with the subject invention;

FIG. 8 is a schematic three-dimensional view showing an embodiment of a waveguide useful in connection with the density measuring ultrasonic transducers in accordance with the subject invention;

FIG. 9 is a schematic three-dimensional view showing an example of another waveguide useful in connection with the density measuring ultrasonic transducers of this invention;

DISCLOSURE OF THE PREFERRED EMBODIMENT

Figure 1:
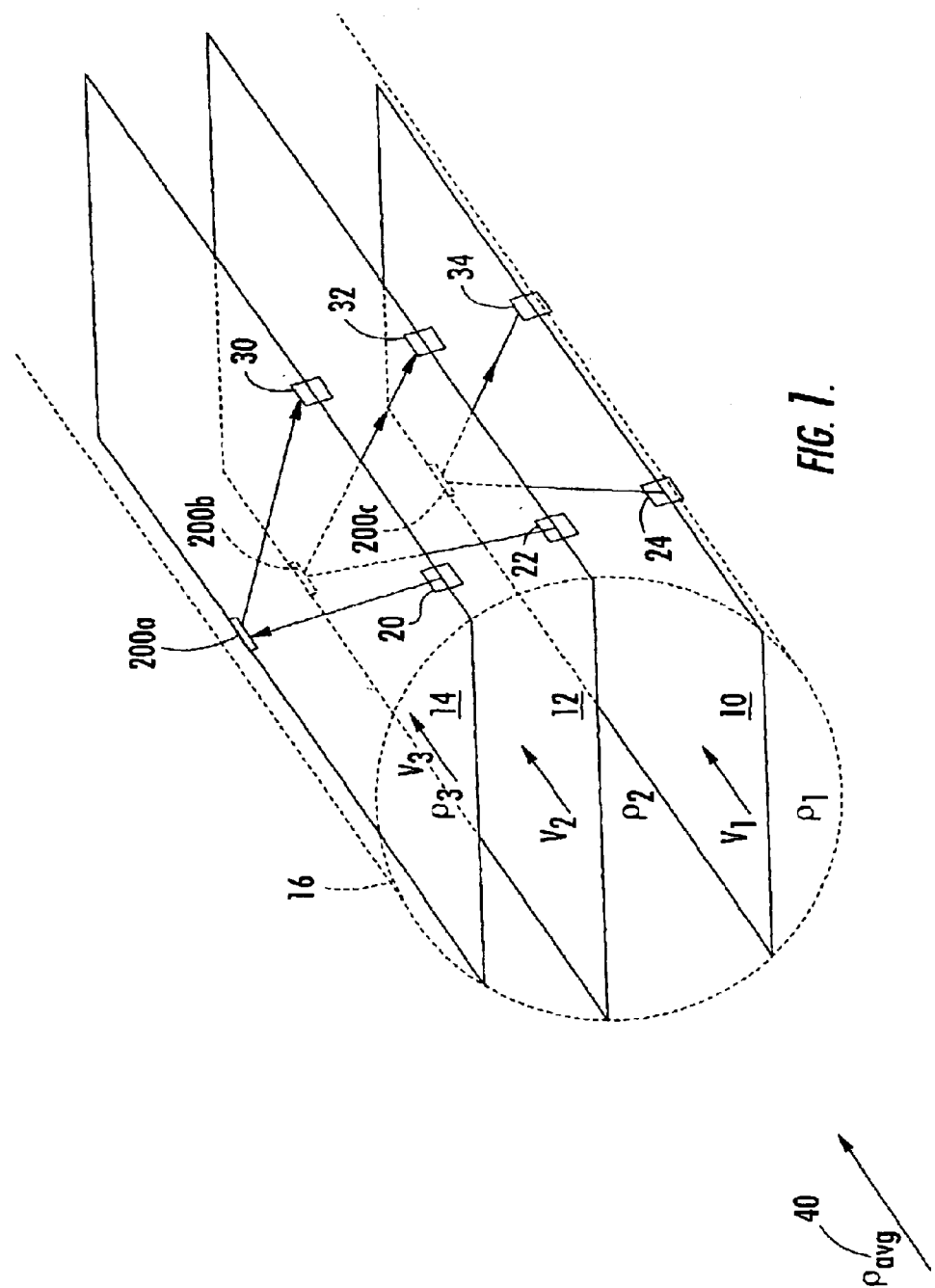
FIG. 1 is a highly schematic view illustrating a general mass flow meter system and the concept of quadrature planes in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

FIG. 1 schematically shows three quadrature planes 10, 12, and 14 for conduit 16. First set of ultrasonic transducers 20, 22, and 24 are oriented to each transmit ultrasonic energy in a given quadrature plane which is reflected off the interior of conduit 16 in midplane 12 or reflected off reflective surfaces 200a, 200b, and 200c which are normal to quadrature planes 10 and 14, respectively, to a second set of ultrasonic transducers 30, 32 and 34. Typically, all of the transducers are piezoelectric and configured to launch longitudinal waves in the fluid flowing in conduit 16. In this way, and as known in the art, the flow velocities $V_1$, $V_2$, and $V_3$, of the fluid in each quadrature plane can be calculated based on the upstream-directed and downstream-directed transit times of the ultrasonic energy in each plane. Thus, the time it takes the ultrasonic energy to traverse quadrature plane 10 from transducer 24 to transducer 34 (with the flow direction) and the time it takes for the ultrasonic energy to traverse quadrature plane 10 from transducer 34 to transducer 24 (against the flow direction) is used to calculate $V_1$, the flow velocity of the fluid in quadrature plane 10. Transducers 22 and 32 are similarly used to calculate $V_2$, the flow velocity of the fluid in quadrature plane 12 and transducers 20 and 30 are used to calculate $V_3$, the flow velocity of the fluid in quadrature plane 14. Flow velocity calculations in accordance with the subject invention may be made based on the techniques described in U.S. Pat. Nos. 5,159,838; 5,962,790; 6,343,511; 5,272,060; 5,437,194; and 5,515,733 all incorporated herein by this reference. In other words, the volumetric flowrate Q can be determined by known quadrature integration of the three velocities $V_1$, $V_2$, and $V_3$.

Then, in the prior art, an average value of the density of the fluid was often assumed to sufficiently represent the actual density distribution and the product of the average density $\rho_{avg}$ and Q determined from quadrature integration of $V_1$, $V_2$, and $V_3$ to thus calculate the total mass flow rate. Thus, in the prior art, the flow velocity of the fluid was assumed to be non-uniform, but the density of the fluid was assumed to be uniform, or assumed to be representable by a single value for density. In effect, such prior art multipath determination of fluid mass flowrate performed calculations equivalent to quadrature integration of $\rho_{avg}V_i$ where i=3, 4, 5, or 6. If i=3, such quadrature integration used $\rho_{avg}V_1$, $\rho_{avg}V_2$, $\rho_{avg}V_3$.

As discussed in the Background section above, however, the density of the fluid in conduit 16 may not be uniform. Instead, for example, the density of the fluid in quadrature plane 10 may be $\rho_1$, the density of the fluid in quadrature plane 12 may $\rho_2$, and the density of the fluid in quadrature plane 14 may be $\rho_3$ and $\rho_1 \rho_2 \rho_3$.

In this invention, quadrature integration is performed on the products of the fluid velocities and fluid densities in each quadrature plane to calculate the total mass flow rate of the fluid more accurately by eliminating errors associated with assuming that the density of the fluid in the conduit is uniform, or representable by its average value. In other words, $\rho_1 V_1$, $\rho_2 V_2$, and $\rho_3 V_3$, are used to calculate the mass flow rate—not, as associated with the prior art, $\rho_{avg}V_1$, $\rho_{avg}V_2$, and $\rho_{avg}V_3$. In this invention, $\rho_1$, $\rho_2$, $\rho_3$, can be determined in a variety of ways resulting in a versatile as well as highly accurate quadrature mass flowmeter system.

Figure 2:
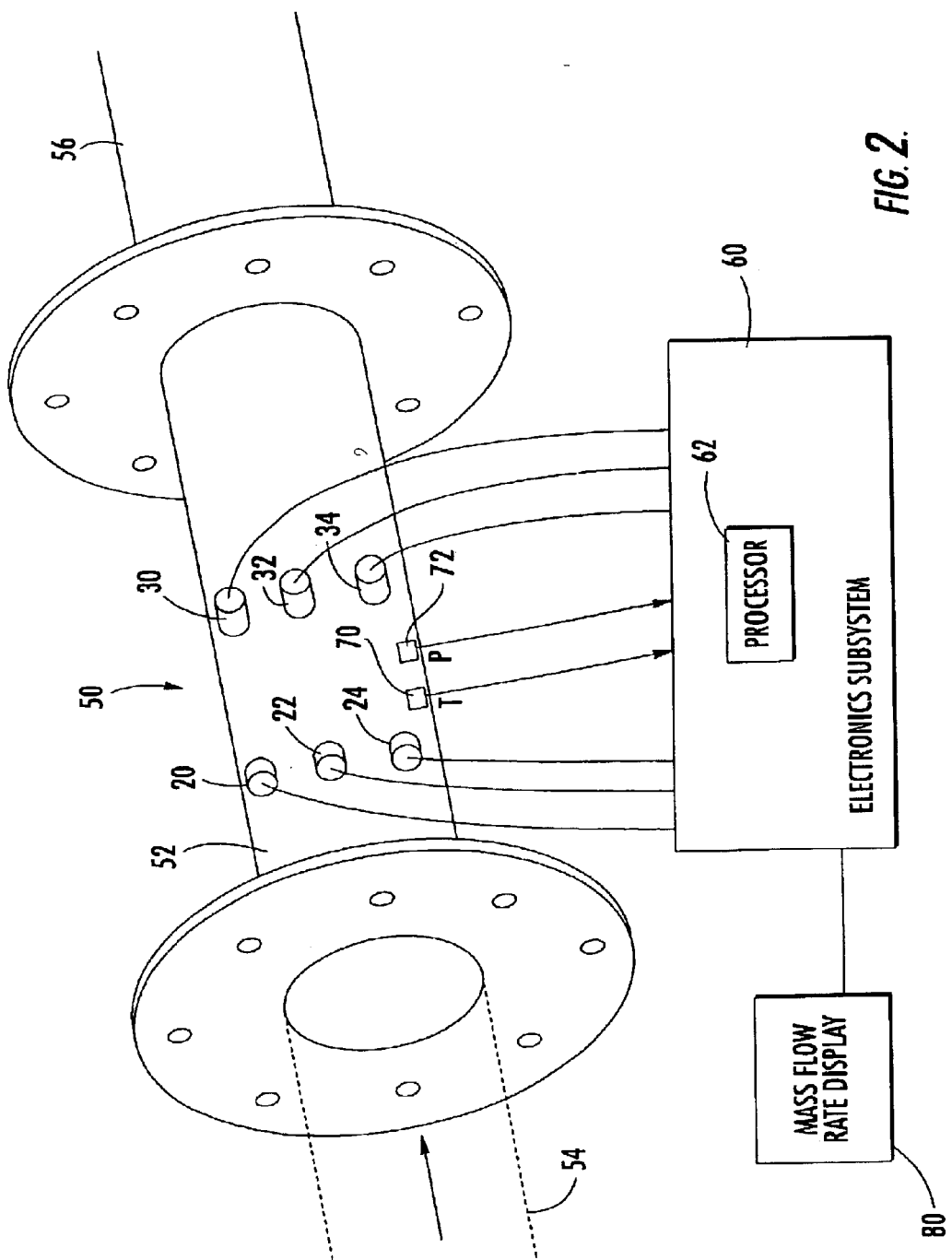
FIG. 2 is a schematic three-dimensional view showing a typical mass flow rate system in accordance with this invention.

Thus, in one example, higher accuracy quadrature mass flow meter system 50, FIG. 2 includes transducers 20, 22, 24, and 30, 32, and 34 aligned to transmit and receive ultrasonic energy along multiple paths in three (or more) parallel quadrature planes as discussed with respect to FIG. 1 above. Typically, the transducers are located in spoolpiece flanged pipe section 52, FIG. 2 which is then installed between conduit sections 54 and 56. The quadrature planes typically extend horizontally as shown in FIG. 1 and perpendicular to the transverse axis of the conduit as also shown in FIG. 1. As shown, all of the transducers preferably are located on the same side of conduit section 52 to minimize crossflow influences, and reflectors (discussed infra) are located on the opposite side of the conduit between the first and second set of ultrasonic transducers for redirecting ultrasonic energy from one set of ultrasonic transducers to the other set along "v-paths", so named because of the path shapes.

These, however, are not limitations of the subject invention. Some of the transducers, if clamp-on type, may be located externally on the actual fluid-carrying pipe 52 thus eliminating nozzles or pipe fittings and/or transducers 30, 32, and 34 may be located diagonally opposite transducers 20, 22, and 24. Those skilled in the art understand there may be many different configurations for the quadrature plane ultrasonic fluid flow velocity measuring transducers. Also, temperature 70 and pressure 72 transducers are typically employed and used in the mass flow rate calculation as known in the art. The fluid pressure may be used along with sound speed to compute density of water or other pure liquids, for example.

In this invention, electronic subsystem 60 with processor 62 is responsive to all of the transducers and is configured or programmed to calculate the flow velocity of the fluid in each quadrature plane based on the transit time of the bi-directionally transmitted ultrasonic energy in each quadrature plane and processor 62 in particular is programmed to perform quadrature integration of the product of the fluid density and fluid velocity in each quadrature plane to calculate the total mass flow rate of the fluid as discussed above. The density of the fluid in each quadrature plane 10, 12, and 14, FIG. 1 is determined in one or more ways or by one or more means discussed infra. Typically, the resultant mass flow rate determination is displayed on readout 80, FIG. 2 to thus record the transfer rate of a commodity such as oil in conduit 50. The other relevant details associated with electronic subsystem 60, FIG. 2 are disclosed in Spitzer, D. W. (Editor) *Flow Measurement—Practical Guides For Measurement Control*, Second Ed. ISA (2001), Chapter 20, pp 515–573, Ultrasonic Flow Meters, by Brown, A. and Lynnworth, L. C.

Figure 3:
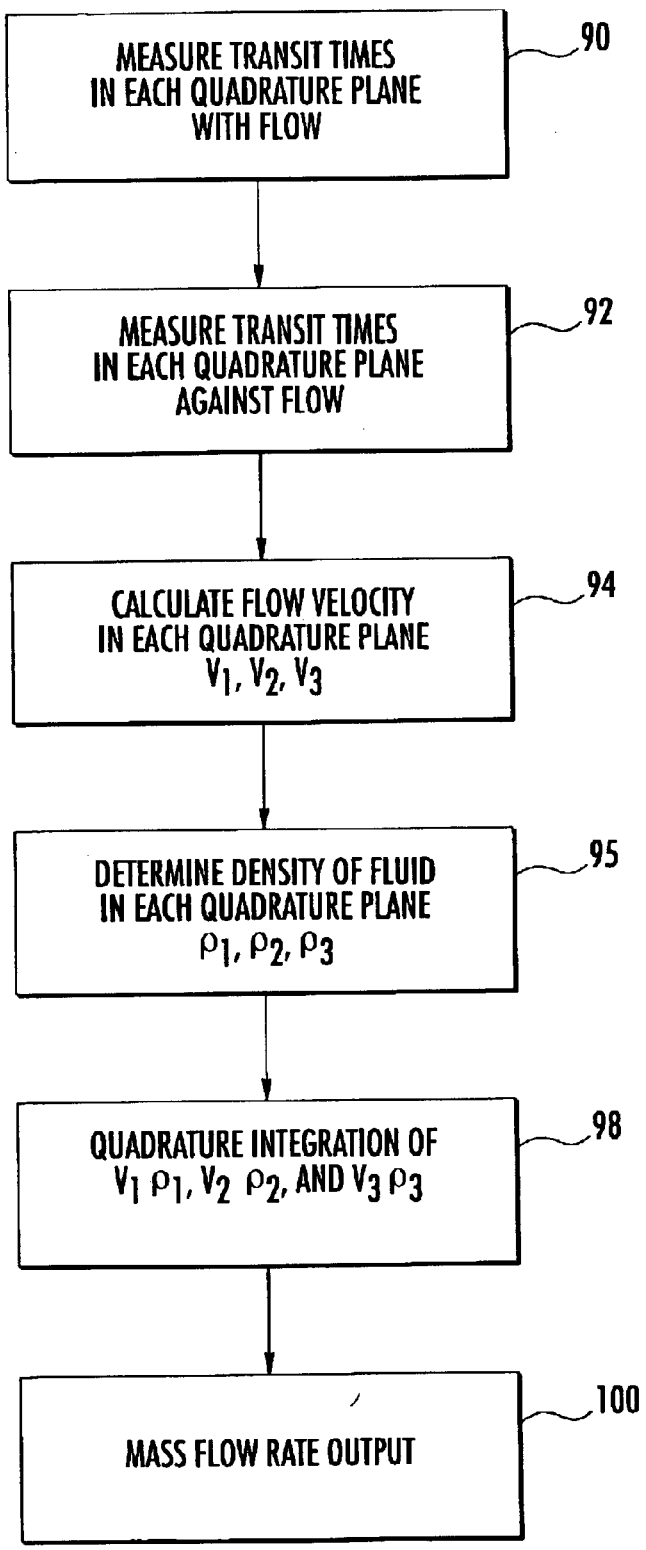
FIG. 3 is a flow chart depicting the primary steps associated with the method of this invention and the programming of the processor associated with the electronic subsystem of the mass flow rate system shown in FIG. 2.

The method of this invention thus includes measuring the transit time in each quadrature plane with the fluid flow direction, step 90, FIG. 3 and measuring the transit time in each quadrature plane against the flow direction, step 92 using, as discussed above, first and second set of ultrasonic transducers 20, 22, 24, and 30, 32, 34, FIG. 2. Processor 62 is then programmed to calculate the flow velocity in each quadrature plane $V_1$, $V_2$, and $V_3$, step 94, FIG. 3 as known in the art. One or more mechanisms or strategies are then used to determine the density of the fluid in each quadrature plane $\rho_1$, $\rho_2$, and $\rho_3$, step 95 and quadrature integration of the products of the fluid density and fluid velocity in each quadrature plane is performed, step 98 typically by processor 62, FIG. 2 to calculate, after taking the conduit area A into account, the total mass flow rate which is output and/or recorded in step 100.

Figure 4:
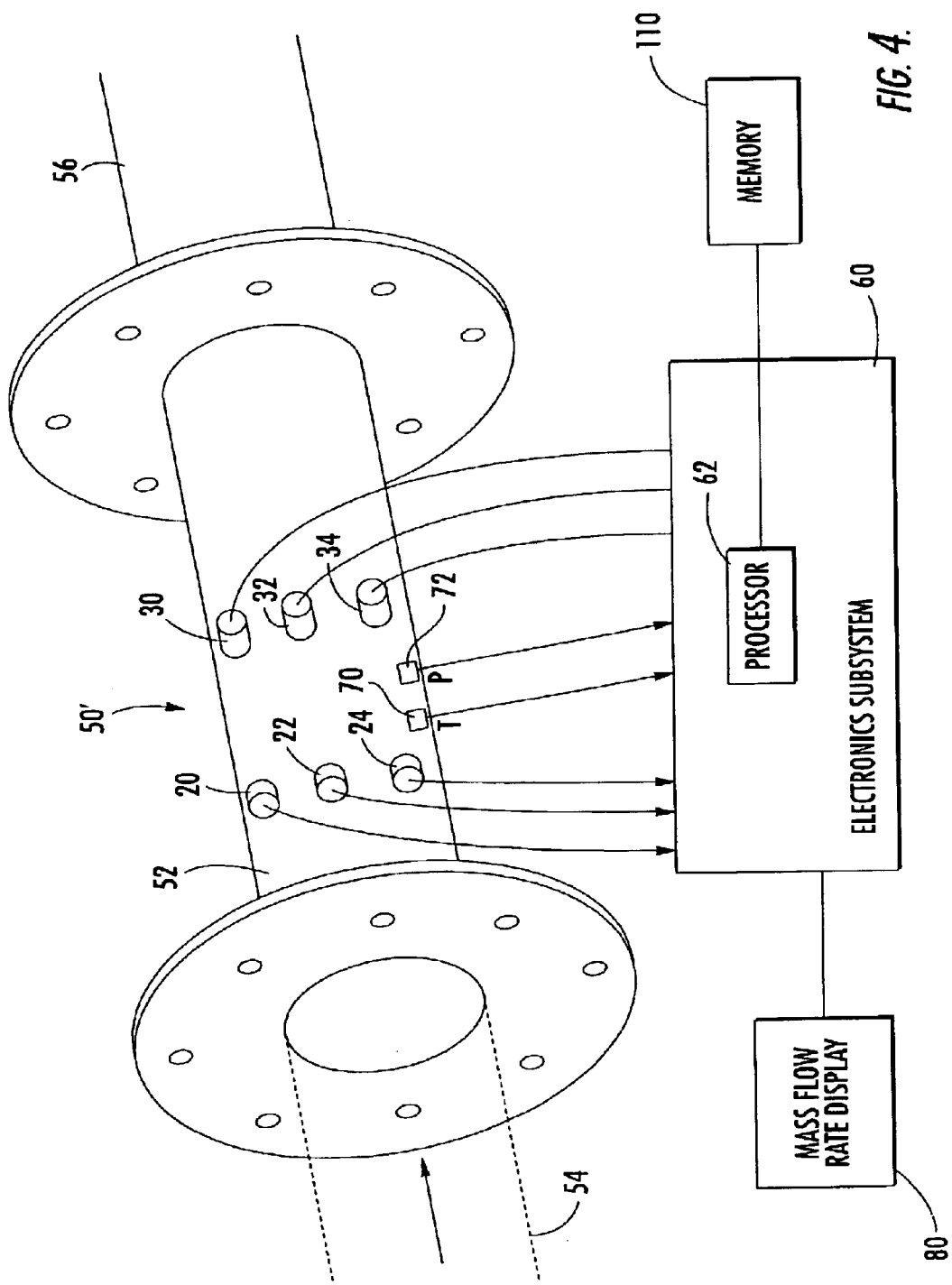
FIG. 4 is a schematic three-dimensional view showing another example of a mass flow rate system in accordance with the subject invention wherein the density determination for the fluid in each quadrature plane is based on a library including stored speed of sound and density data for various liquids, including, where necessary, the influence of pressure.

In one example, the density of the fluid in each quadrature plane $\rho_1$, $\rho_2$, and $\rho_3$ in step 95 is determined by calculating the speed of sound in each quadrature plane from the transit time of the ultrasonic energy through the fluid in each quadrature plane and using a library stored in memory 110, FIG. 4 including speed of sound and density data for different liquids. Thus, processor 62, after determining the transit times from signals transmitted between transducers 20, 22, and 24 and 30, 32, and 34, calculates the speed of sound in each quadrature plane and accesses memory 110 to correlate the speed of sound in each quadrature plane to the density in each quadrature plane and then performs quadrature integration of the product of the fluid densities and fluid velocities in each quadrature plane as discussed above. System 50' is thus particularly useful for pure and well defined fluids for which, over a broad range of pressures and temperatures, a single-value relationship exists between density and sound speed with some compensation for pressure and possibly temperature as well as noted above and as provided as input to processor 62 via temperature transducer 70 and pressure transducer 72.

In most cases, it will be convenient and economical to use the sound speeds along the very same inclined paths that are used to obtain flow velocities. However, if the inclined paths are refracted, there may be uncertainties in the refracted path that limit the accuracy obtainable for the sound speeds. Refracted inclined paths are discussed in U.S. Pat. No. 6,047,602 incorporated herein by this reference. In such a case, higher accuracy is obtainable by measuring sound speeds in a plane perpendicular to the conduit axis such that the speed of sound paths are the same in the end view as the projections of the velocity paths. If a three-path Chebyshev solution is contemplated, for example, then the paths would lie on the diameter and the edges of the inscribed square in the end view. The use of sound speed measurement in a perpendicular plane, as part of a transit time flow meter, is discussed in U.S. Pat. No. 3,731,532 incorporated herein by this reference. But, in the '532 patent, sound speed is not used to determine fluid density. The use of sound speed to determine density is also discussed in chapter 6 of the book *Ultrasonic Measurements for Process Control—Theory, Techniques, Applications*, Academic Press (1989) but not along quadrature paths congruent in a projected view with velocity-sensing multipaths.

Figure 5:
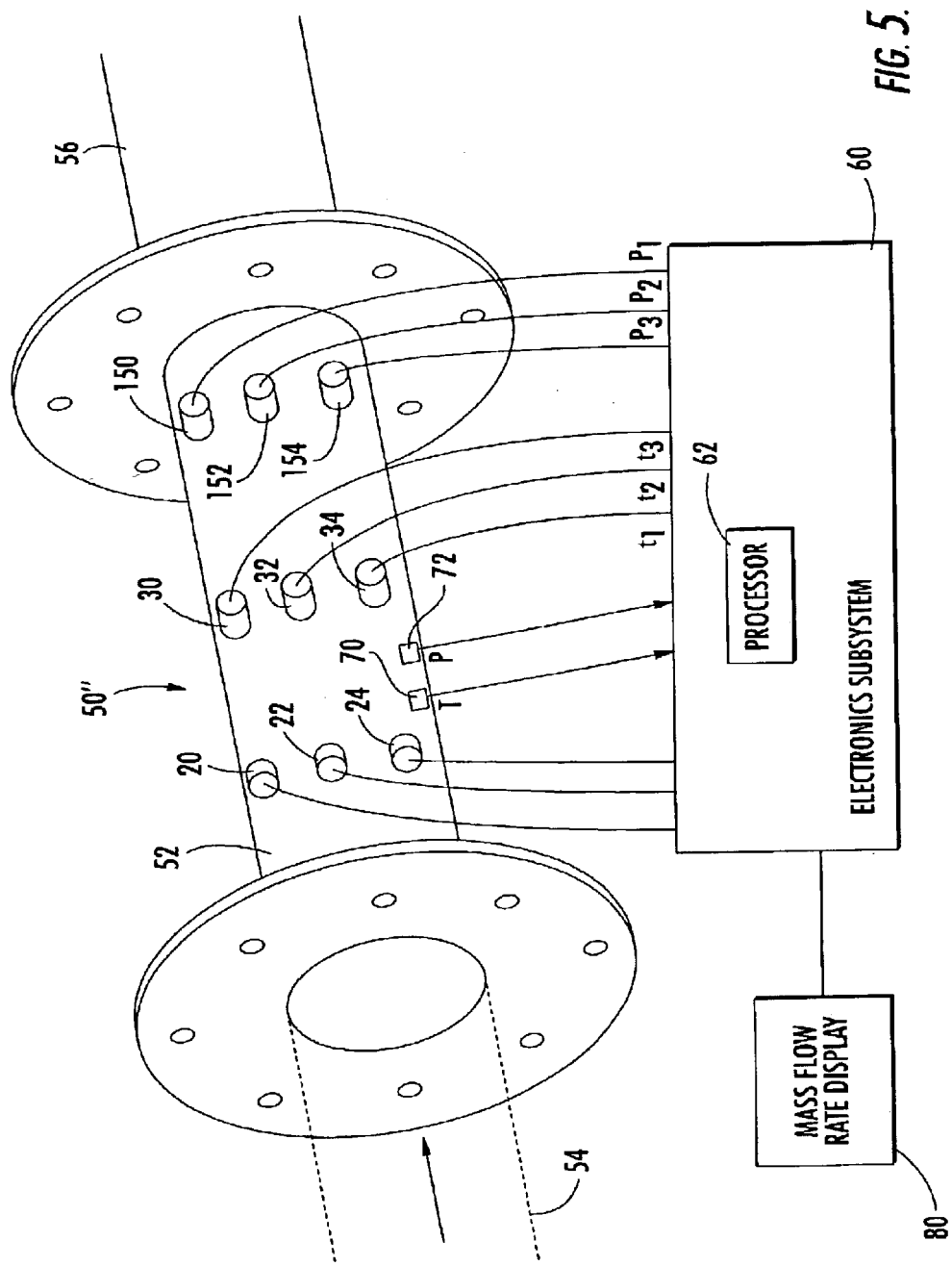
FIG. 5 is a three-dimensional schematic view showing another example of a mass flow rate system in accordance with the subject invention wherein the density determination for the fluid in each quadrature plane is measured by a set of torsional wave producing transducers.

In contrast to a library stored in memory 110, FIG. 4, the density of the fluid in each quadrature plane in system 50'', FIG. 5 is measured by a third plurality of ultrasonic transducers 150, 152, and 154 located downstream from the second plurality of transducers 30, 31, and 34 and also aligned with the quadrature planes and configured to transmit ultrasonic energy in a torsional mode into ultrasonic waveguide sensors and typically using a waveguide extending completely through conduit section 52. Processor 62, FIG. 5 is then programmed to calculate the density of the fluid in each quadrature plane based on the transit time of the ultrasonic energy in the portion of the ultrasonic waveguide wetted by (immersed in) the fluid. Torsional transit times are obtainable with the third plurality of transducers 150, 152, and 154 according to U.S. Pat. No. 4,893,496 incorporated herein by reference.

Figure 6:
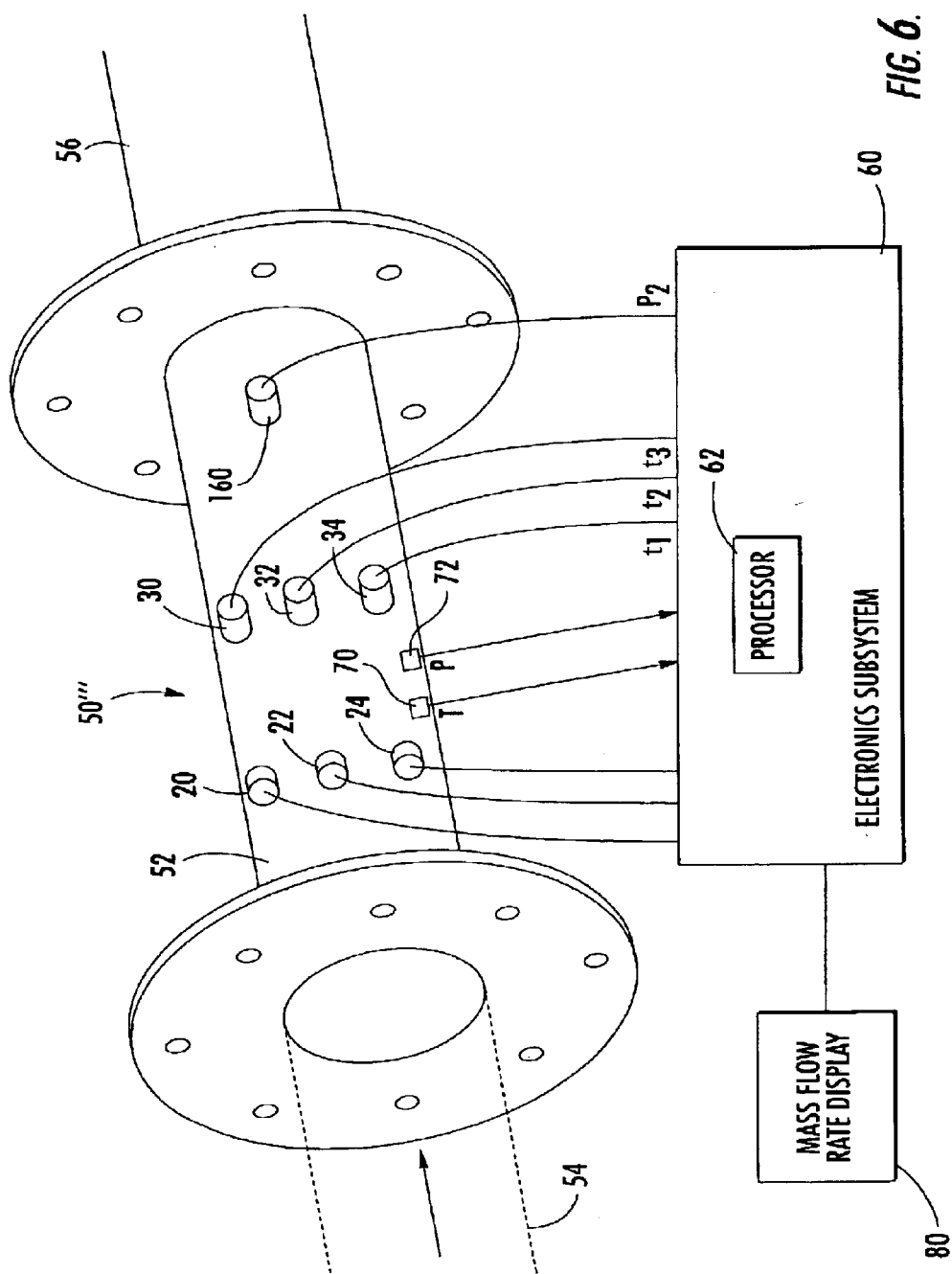
FIG. 6 is a schematic three-dimensional view showing another example of a mass flow rate system in accordance with the subject invention wherein the density determination for the fluid in each quadrature plane is based on the output of a single torsional wave producing transducer and the use of Rao's rule or a modified Rao's rule.

In another example, system 50''', FIG. 6 includes only a single torsional wave producing transducer 160 located downstream from the second plurality of transducers 30, 32, and 34 and aligned with one quadrature plane (in this example the quadrature midplane defined by transducers 22 and 32 or quadrature plane 12, FIG. 1) and configured to transmit torsional ultrasonic energy into a density-sensing ultrasonic waveguide immersed in the fluid. Processor 62 is then programmed to calculate the density of the fluid in that quadrature plane based on the transit time of the ultrasonic energy in the waveguide density sensor obtained with ultrasonic transducer 60. Processor 62 derives the density of the fluid in the two other quadrature planes based on Rao's rule. Rao, M. R., *A Relation Between Velocity of Sound in Liquids and Molecular Volume*, Indian J. Physics, Vol. 14, pp109–116 (1940). For Liquid hydrocarbons, $\Delta c/c \approx 3\Delta\rho/\rho$, meaning, for small density excursions, say ±1%, the sound speed changes by about ±3%, respectively. This invention recognizes that in FIG. 1 the small differences in sound speed $c_1$, $c_2$, and $c_3$ in planes 10, 12, and 14 correspond in cases subject to Rao's rule to density variations. As a numerical example, if $c_2$=1000 m/s, $c_1$=970 m/s, and $c_3$=1030 m/s, and if $\rho_2$=1000 kg/m$^3$, Rao's rule predicts $\rho_1$=990 kg/m$^3$ and $\rho_3$=1010 kg/m$^3$. Moving now to FIG. 6, transducer 160 and associated torsional density sensor and electronics yield $\rho_2$. Using $c_1$, $c_2$, and $c_3$ and Rao's rule (or a modified form of it) processor 62 then infers $\rho_1$, and $\rho_3$. Quadrature integration of $\rho_1 V_1$ etc. proceeds as discussed above.

The factor of 3 in the "Rao's rule" equation may be modified or generalized to $R_{ao}$ to recognize that, according to NIST data in Matson et al., Proc. 5$^{th}$ ISFFM (April 2002), plots of c versus $\rho$ exhibit non-constant slopes that depend, in the case of alkanes, on which alkane is present (hexane, propane, butane, etc.). There is some slight dependence on pressure, and on temperature.

For gases, aside from pressure, the relation between $\rho$ and c arises fundamentally from $\rho$ being proportional to gas MW (molecular weight) while c is proportional to the square root of MW. For flare gas the empirical $\rho$-c relation is shown in Smalling et al's 1986 U.S. Pat. No. 4,596,133, while for air with relative humidity from 0 to 100% the $\rho$-c relation is plotted in the above mentioned paper by Matson et al.

FIG. 7 shows in more detail the location for known torsional ultrasonic transducers 150 and 154 from FIG. 5 and at the opposite ends of the sensor, transducer locations 150a, 150b. These transducers interrogate waveguide sensors passing through pipe section 52 using housing 180. Examples of different arrangements for torsional wave producing transducers used to measure fluid density are disclosed in U.S. Pat. Nos. 5,456,114; 4,596,133; and 4,893, 496 all incorporated herein by this reference.

FIG. 8 shows waveguide 190 which tapers to provide impedance matching between circular cross-sections 192 and diamond cross-section 194. FIG. 9 shows another possible waveguide 190' with diamond or cusped diamond section 194' with a 3:1 aspect ratio. The sharpest edges are intentionally rounded to 0.1 mm radius so that in service the shape does not change due to wear.

Figure 10:
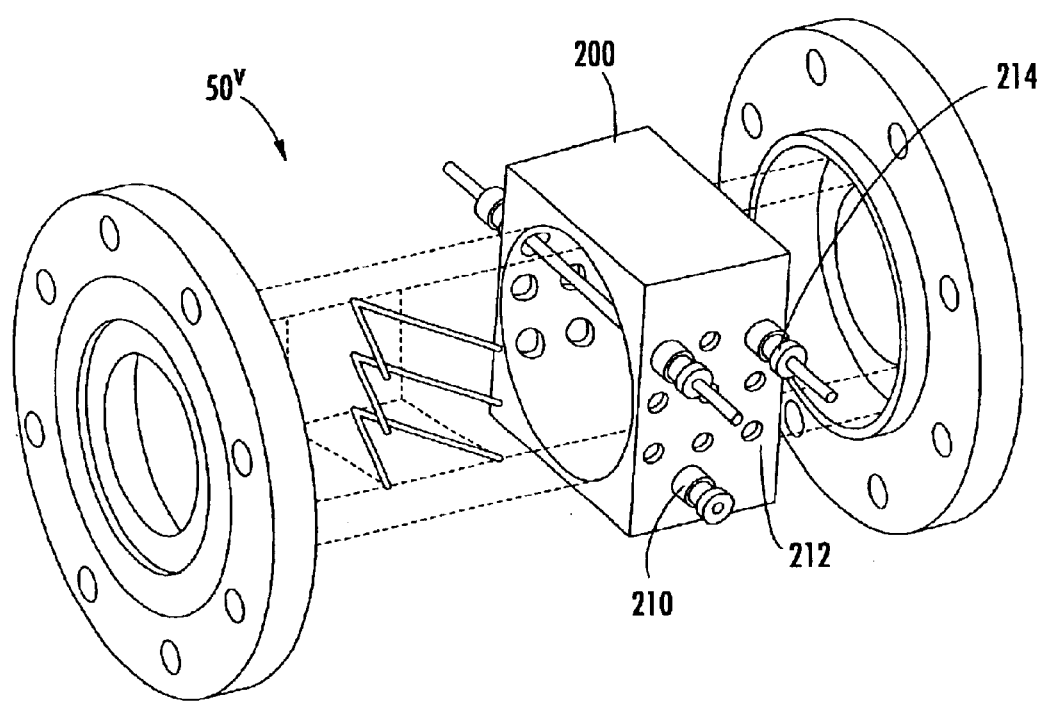
FIG. 10 is a schematic three-dimensional view showing still another example of a mass flow rate system in accordance with the subject invention.

FIG. 10 shows the use of a thickened section of the downstream density sensing region provided by density block 200. Block 200 is long enough in the axial direction to accommodate three sets of waveguides 210, 212, and 214, one for density, one for viscosity, and one for temperature. There may be nine probes and nine torsional transducers or 18 torsional transducers to measure density depending on the space allowances. Density block 200 can be simplified somewhat if the temperature measuring waveguides lie within the viscosity tube sensors and all of the measurements can be of pulse-echo type. Different circumstances and sensor materials dictate how many possible penetrations and sensors are actually needed to achieve the required accuracy for density and mass flow rate measurements.

Figure 11:
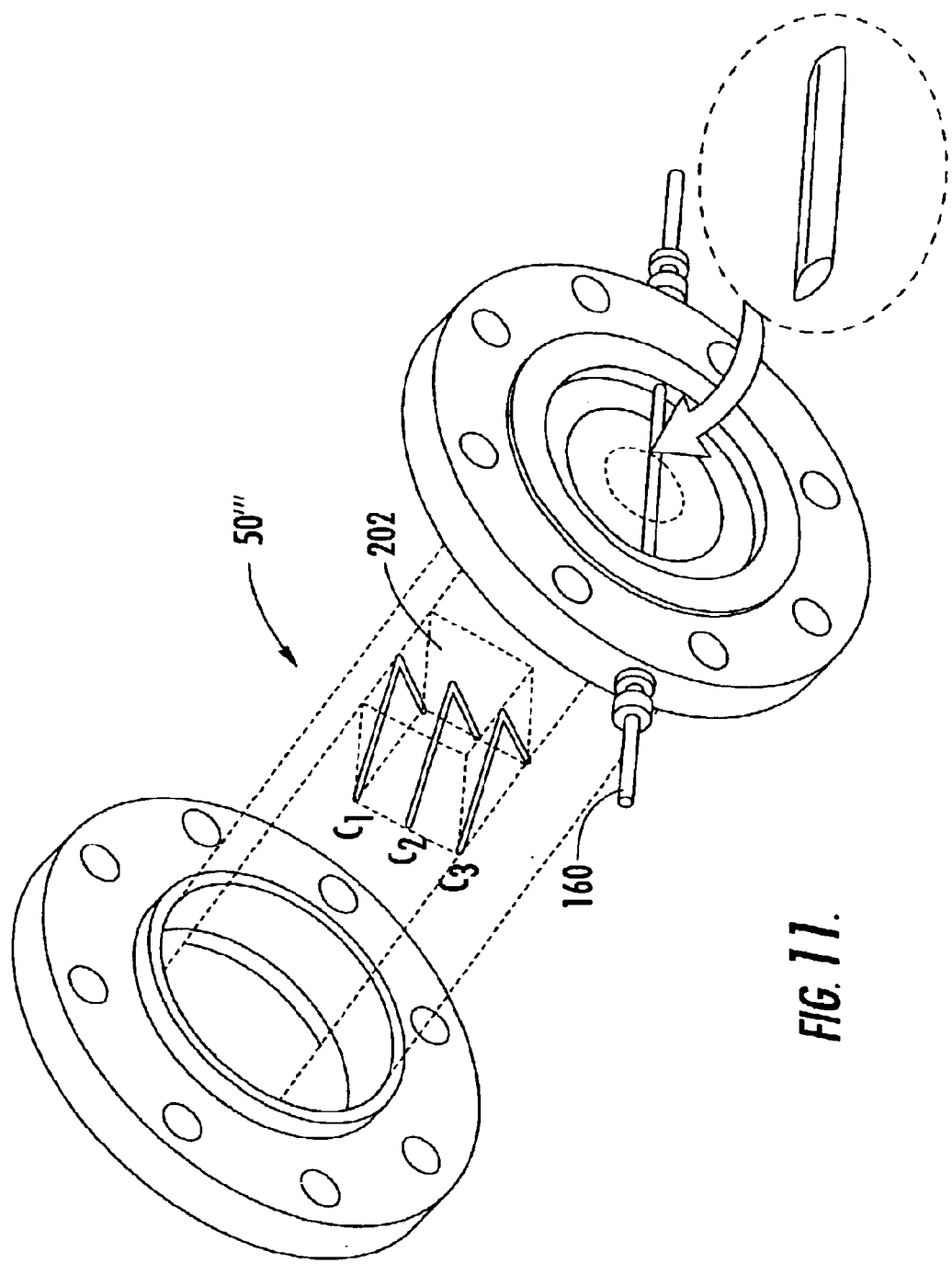
FIG. 11 is a schematic three-dimensional view showing an example of still another mass flow rate system in accordance with the subject invention.

FIG. 11 schematically shows a single density measuring probe associated with the system described above with respect to FIG. 6 and, in one implementation, the v paths defined by ultrasonic transducers 22 and 32, FIG. 6 (quadrature plane 12, FIG. 1) yield a velocity and speed of sound for that quadrature plane and the two planes above and below the central quadrature plane similarly yield velocity and speed of sound measurements. Using a variant of Rao's rule, the actual density measurement is obtained with transducer 160, FIG. 11 and processor 62, FIG. 6 associates that density measurement with the speed of sound obtained upstream in midplane v path. The density in the other two planes is inferred using a modified Rao's rule:

$$\rho = \rho_0 (1 + \Delta c / R_{ao} c) \quad (1)$$

where $R_{ao}$ is approximately 3, the exact value depending on the liquid's composition.

As a numerical example, consider a 316 SS sensor of length~100 mm and of essentially diamond cross section and an aspect ratio of three. A 6.2 $\mu s$ shift was observed when the sensor was first placed in air and then immersed in water. In other words, for a four inch (approximately 100 mm) sensor, an increase in transit time of some 6200 ns was observed for a density increase of about 1000 mg/cm$^3$. This is sensitivity of 6.2 ns per mg/cm$^3$. Combining this with a modified Rao's rule, $\rho_1$ times $V_i$ products can be formed in each of the three Chebyshev planes and then integrated by the Chebyshev quadrature method taking pipe area into account to obtain the mass flow rate $M_f$.

Figure 13:
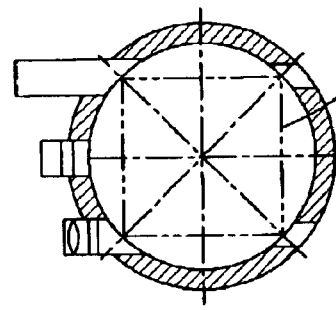
FIG. 13 is a cross-sectional view showing the location of two transducers shown in FIG. 12.
Figure 12:
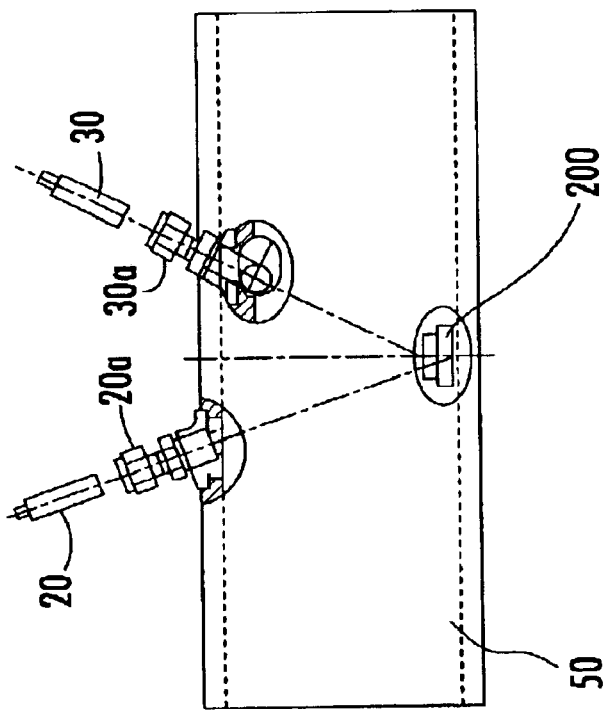
FIG. 12 is a schematic view showing two ultrasonic transducers and their specific alignment in a conduit in accordance with the subject invention in order to measure the transit time of ultrasonic energy through the fluid with and against the flow direction.

FIG. 12 shows an example of ultrasonic transducers 20 and 30 from FIGS. 2, 4, 5, and 6. Typically, each ultrasonic transducer is installed in a compression fitting 20a, 30a located in an insert attached to conduit 50. FIG. 12 also shows reflector member 200 disposed in conduit 50 to re-direct ultrasonic energy from transducer 20 to transducer 30. FIG. 13 shows the preferred arrangement for fluid paths having axial projections equal to the edge of an inscribed cube 202 also shown in FIG. 11. These projections equal 0.707D where D is the conduit inside diameter. The inserts for the transducers in FIGS. 12 and 13, typically fit into oblong holes milled with unequal shoulders so that orientation is controlled. The inserts are typically welded to the spool piece or conduit section. Afterwards, compression fittings thread into the inserts and the transducers are installed in the compression fittings. Other mechanical arrangements, however, are known in the art. The interactions with the fluid occur in a volume defined by planes at the ends of inscribed cube 202 providing the advantages of short axial length and easy to explain location of quadrature paths. The axial interaction length is less than what would be achieved if the transducers were angled at 30 or 45 degrees. As a numerical example, in a three inch pipe, the diameter v path, when exposed to flowing air, generates a time difference upstream minus downstream of 2 microseconds per m/s of flow. As all of the fluid paths have the same axially-projected length L, the same time difference is generated for a 1-m/s flow velocity in all three quadrature planes.

Figure 14:
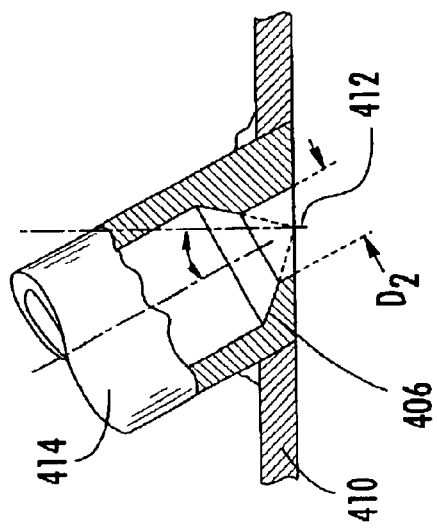
FIG. 14 is a schematic three-dimensional view showing a virtual reflector useful in accordance with the subject invention.

For temperature extremes, solid or tubular buffers may be used so the transducers are not exposed directly to temperatures beyond their ratings. Solid buffers may include a solid waveguide which is marginally dispersive as disclosed in U.S. Pat. No. 5,159,838. Or, they may consist of a bundle as disclosed in U.S. Pat. Nos. 5,962,790 or 6,343,511 all incorporated herein by this reference. Solid buffers "ring" because each pulse echoes several times or many times before the waveguide buffer is quiet enough to be interrogated again. This tends to show the system response time. A partial remedy to this problem may be effected by treating each of the first two or few (n) reverberations as a legitimate source of interrogating pulses. This allows data acquisition at up to n times the numerical prf (pulse repetition frequency). If n=3, a 100 Hz prf yields transit time data at a 300 Hz rate. This method requires a multiwindow receiver, as described infra for a different purpose. For tubular buffers, it is preferred to generate a reference echo at or very near the internal wall of the pipe. This is accomplished with truncated cone 406, FIG. 14 whose vertex is coincident with the intersection of the buffer axis and the pipe interior and this arrangement is thus referred to as a virtual reflector as it does not really lie at the pipe inside. Pipe wall 410 is penetrated by a through hole of diameter $D_2$ which is 90 degrees countersunk such that the conical pattern has a vertex exactly a the pipe interior point 412. This pattern generates a useful reference echo at 100 kHz when insonified through pipe nozzle 414 having an inside diameter $D_1$ of at least approximately five wavelengths. Nozzle 414 is welded to pipe wall core 10. Typically, the incident angle $\theta_1$ is 30° to the normal. In other embodiments, e.g. when the objective is a perpendicular path as in FIG. 5, nozzle 414 is not inclined with respect to pipe wall 410.

Figure 15:
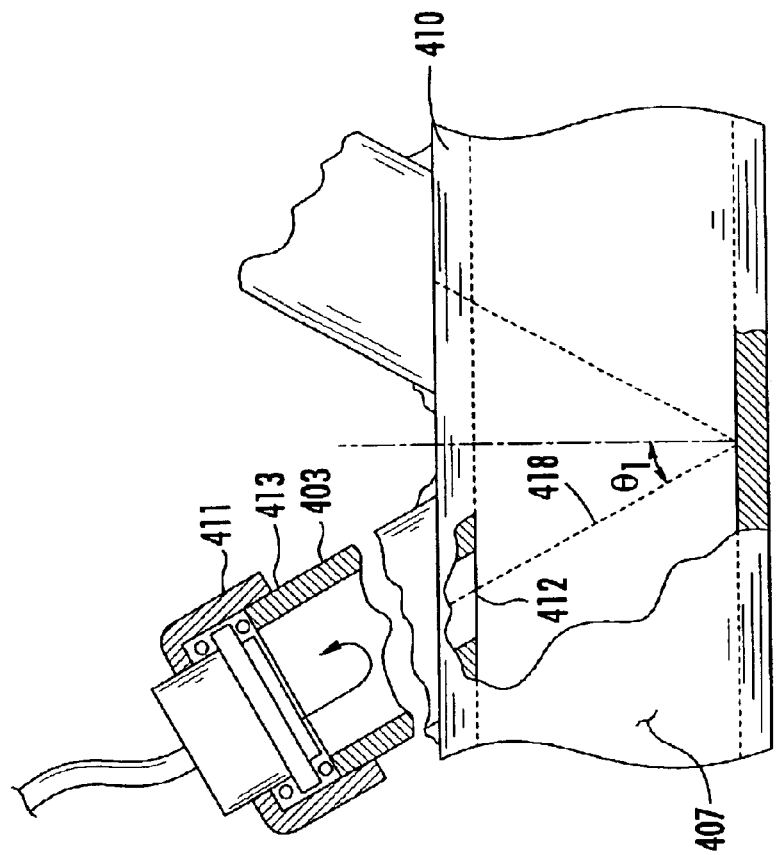
FIG. 15 is a schematic view showing a typical transducer useful for measuring the transit time of ultrasonic energy through fluid in a conduit in accordance with the subject invention.

In FIG. 15, pipe wall 410 includes two nozzles symmetrically welded about a center line. Reference-echo generating truncated cone countersinks again yield a virtual vertex 412 at the pipe wall interior. The through-hole is large enough to allow a good signal transmission signal of the particular v path 418. The commercially available T7 air transducer obtains a reference-echo whose time of travel divided by two, is to be subtracted from the total transit time. Further details concerning the transducer arrangements are disclosed in U.S. Pat. Nos. 5,272,060; 5,437,194; and 5,515,733.

In any embodiment, a more accurate quadrature multipath mass flow meter system and method especially useful in connection with fluid flows having non-uniform density distributions is effected by quadrature integration not of the product of the average fluid density and the actual fluid velocities in each quadrature plane, but, instead, by quadrature integration of the product of the actual fluid densities and the actual fluid velocities in each quadrature plane to calculate the total mass flow rate of the fluid more accurately. That is, quadrature integration is performed on the products of the fluid velocities and fluid densities in each quadrature plane to calculate the total mass flow rate of the fluid more accurately by eliminating errors associated with assuming that the density of the fluid in the conduit is uniform or representing an acknowledge gradient by its average value, for purposes of mass flowrate computation. In other words, $\rho_1 V_1$, $\rho_2 V_2$, and $\rho_3 V_3$, are used to calculate the mass flow rate—not, as associated with the prior art, $\rho_{avg} V_1$, $\rho_{avg} V_2$, and $\rho_{avg} V_3$. In this invention, $\rho_1, \rho_2, \rho_3$, can be determined in a variety of ways discussed above resulting in a versatile as well as highly accurate system.

One typical high-accuracy quadrature multipath mass flowmeter is comprised of a combination of ultrasonic density sensing paths which in the end view are congruent. Flow velocity is preferably determined by a contrapropagation method which yields speed of sound too. Density is preferably determined from the speed of sound in the same fluid medium along the same paths in which the flow velocity is determined. However, in impure or ill-defined fluids, particularly arbitrarily-mixed or straight out of the ground liquids, the speed of sound in the fluid is not an accurate indicator of density. In such cases, the density is preferably determined from the speed of sound in a waveguide, where the ultrasonic mode, e.g. torsion, propagates at a speed that decreases in a known manner as fluid density increases. The rate at which mass is transported through the conduit is obtained by determining for each path, the density and velocity product, and then integrating according to Chebyshev or other form of Gaussian quadrature.

The present invention thus relates in particular to ultrasonic mass flowmetering of fluids such as liquids or gases, where the general goal is to achieve high accuracy, 1% or better, with 0.5% or in some cases 0.25% as a preferred goal. The problem becomes complicated when the density is not the same everywhere, i.e. the fluid is inhomogeneous. Further complications ensue when the fluid is ill-defined or impure; when viscosity $\eta$ and/or temperature T varies widely over time or seasonally.

In summary, then, the objectives are to obtain a high-accuracy (e.g. 0.5% of reading) ultrasonic quadrature mass flowmeter for fluids based on quadrature integrations of $\rho_i V_i$ (density times velocity) products along i paths, where i>2 and preferably is between 3 and 5. Any of the paths may be single traverse or multiple traverse. The paths used for the $V_1$ and for the $\rho_1$ are typically the same or coincident when viewed in an end view of the conduit. In other words the corresponding $\rho_i$ and $V_1$ paths lie in parallel planes tangent to construction circles of reduced radii $R_{cc}$ where, for off-diameter quadrature paths, $R_{cc}$=0.707 (for a three-parallel-plane Chebyshev solution) and 0.309 and 0.809 (for one of the four-parallel-plane quadrature solutions).

The flow velocities $V_1$ are typically determined by prior art methods of contrapropagation. The densities $\rho_1$ are determined from sound speeds $c_i$ along the same actual paths or congruent with projected paths used for determining $V_1$. For example, one or more of the $c_1$ can be determined in a plane perpendicular to the conduit axis. For fluids that are nearly incompressible (e.g. water and many other liquids), both $\rho_1$ and $V_i$ are hardly influenced by pressure P. In such cases, for a spoolpiece or duct of known cross sectional area A (preferably temperature-compensated for thermal expansion based on the mean sound speed $<c_1>$) a rough estimate of P (e.g. ±10 bar) suffices for a high-accuracy result in mass flowrate $M_f$. For compressible fluids (e.g. air and other gases, and some two-phase or multiphase fluids) an accurate measure of P is needed in order to convert the $V_i$ and $c_i$ data to $M_f$. When the composition is uncertain, $\rho_i$ may not be able to be determined accurately from $c_i$. Hence the goal of high-accuracy in $M_f$ generally is obtained by this method usually only when the relation between $\rho_1$ and $c_1$ has an uncertainty in the ten to one range 0.05 to 0.5%. In practice, this means one example of the quadrature mass flowmeter generally is better suited to pure and/or well-defined fluids where interfering effects of composition, and P to the extent the fluid is compressible, are substantially absent. Where the fluid is impure or ill-defined, a waveguide sensor in which propagation (usually c but sometimes attenuation) is reproducible, calibratable or calculable function of fluid density $\rho$, provides an analogous solution, but at the expense of intrusion into the flowing fluid.

In most cases it will be convenient and economical to use the sound speeds along the very same inclined paths as are used to obtain the flow velocities. However, if the inclined paths are refracted, as in applicant's U.S. Pat. No. 6,047,602, there may be uncertainties in the refracted path that limit the accuracy obtainable in the fluid sound speeds. In this case, higher accuracy is obtainable by measuring sound speeds in a plane perpendicular to the spoolpiece or pipe axis, such that the c paths are not refracted and the same in the end view, as the projections of the v paths.

A further refinement of the invention contemplates simultaneous launching of the multiple beams, but in such a way as to delay the arrival over each path of interest so that the arrival lands in a window time-separated from all other arrivals. See U.S. Pat. No. 5,515,733. Let us use the three-path Chebyshev geometry as an example, and a six-inch ID (inside diameter) pipe as a numerical example, and assume small reflectors are positioned at the inside of the pipe such that the three paths are in fact v paths. Let the diameter and one of the "edge of square" paths be inclined at 30° from the normal in their planes, and let the other off-diameter path be inclined at 45°. These path lengths differ from one another by about 2 inches or 50 mm. If the fluid were water near ordinary temperature, the three arrivals would be separated by some 32 microseconds, just due to these water path differences.

Alternative means for separating the arrivals include differentially recessing the source and receiver transducers, buffering by unequal length buffers, or electronically delaying transmissions or receptions in the three paths. As a pulse length of one or a few microseconds is easily achieved and is sufficient for water flow measurement at a center frequency of around 1 MHz, the delays in this example are quite adequate to achieve the sought separation. If the several arrivals are time separated, then a multiwindow intervalometer can time the upstream and downstream interrogations according to contrapropagation flowmeter principles, and compute the several V and c values. After converting the c values to densities, the requisite multiplications can be performed for each chord, and the results weighted according to quadrature theory. In this situation only one electrical channel is required, rather than three as might be thought necessary for accurate timing in three different planes. If the paths are crossed in each measuring plane, instead of reflected, twice as many transducers are needed, and perhaps twice as many electrical channels.

Reflectors at the path vertexes of midradius interrogations are shown explicitly on page 388 in a chapter the applicant co-authored with V. Mágori, appearing in Vol. 23 in *Physical Acoustics*, edited by E. P. Papadakis and published in 1999 by Academic Press. Time-delayed pulses communicated between pairs of electrically-paralleled transducers is shown in applicant's U.S. Pat. No. 5,515,733.

For a commonly-used four-path quadrature solution, e.g. the paths used by Sochaczewski et al. (1981) the off-diameter paths can be described as being in planes tangent to construction circles of $R_{cc}$=0.3090 and 0.8090. The weights 0.138 and 0.362 used in Malone and Whirlow and in Sochaczcwski et al. for velocity are now to be applied to density times velocity products.

One advantage of the three-path solution is one of the paths is in a diametral plane and therefore it allows clamp-on transducers. It also uses less transducers and fewer ports than the four-path solution, an economic advantage even if all transducers are wetted.

If the fluid medium is sufficiently pure and well-defined, c suffices with little or no pressure compensation, to determine density ρ. However, most fluids, e.g. liquids coming from the earth, e.g. natural gases, and even refined fuels like gasolines and diesel fuels, are not in this category. For such cases, ρ responsive waveguide sensors strung along the same quadrature paths are used having the characteristic that the phase velocity of a guided mode, e.g. torsional mode, decreases as the liquid density increases around that waveguide. This permits the invention to be generalized with respect to fluids, yet retain the basic sound-speed measurement along quadrature paths, or in quadrature planes, determining therefrom the density in each of i paths, computing density and velocity products along each of the i quadrature paths, and then weighting these products by traditional quadrature formula weights, multiplying by conduit area A, the result being the mass flowrate $M_f$.

Most of the discussion so far applies to through-transmission or pulse-echo. As stated earlier, pulse-echo v-path measurements means introducing reflectors at the vertexes of the outboard v paths and optionally at the diameter v path as well. In most instances the diameter v path can utilize the natural pipe curvature. Details on reflecting inserts for off-diameter v paths are shown in applicant's U.S. Pat. No. 6,047,602 as well as in FIGS. 12 and 13.

The quadrature paths may be interrogated between narrow flat surfaces created parallel to one another on the inside and outside of the conduit for t-t (through-transmission) or p-e (pulse-echo) paths. A four-path quadrature arrangement may be used with the p-e represented by transducers only on the right hand side of the conduit. The transducers are coupled against the exterior flats.

If the fluid is pure and well-defined then V and c measured along these three v paths with appropriate compensation, yield the flow and density information sufficient to compute mass flowrate (assuming area A is known). Three density-sensing waveguide probes made according to U.S. Pat. No. 4,893,496 are operated in through-transmission or pulse-echo mode. For liquids of low viscosity, <0.5 poise and especially <0.1 poise, it often suffices to compute the fluid density from the increase in sensor transit time, without compensating for viscosity. Temperature T within the fluid can be estimated from T measurements outside the vessel, said T measurements being made by a thermally-insulated strap-on commercial temperature sensor (thermocouple, resistance type or integrated circuit type). This T sensor must be in good thermal contact with the pipe. The T measurement is useful if it is necessary to convert the measured density at some arbitrary process temperature to density at standard conditions, e.g. 20° C. or 0° C.

The density sensor or sensors can be used in a t-t (through-transmission) configuration, with the sensors sealed in place with commercial Cajon™ Ultra-Torr compression fittings. The density sensor typically contains a diamond or cusped diamond section with 3:1 aspect ratio. The sharpest edges are intentionally rounded to ~0.1-mm radius so that in service, the shape does not change due to wear. Several means are available to excite the torsional wave and to receive it.

Torsional transduction is described in Scarrot, G. G. and Naylor, R. *Proc. IEE* 103B (Suppl. 3), pp. 497–508 (1957); Wiedemann (described in Brockelsby, C. F.; Palfreeman, J. S. and Gibson, R. W., *Ultrasonic Delay Lines*, Iliffe Books LTD (1963) pp. 137–138; and Andreatch, P., and Thurston, R. N., *J. Acous. Soc. Am.* 29 (1) pp. 16–19 (January 1957).

The diamond cross section sensor depicted in FIG. 8 preferably has a short overall length, roughly only 50% longer than the pipe diameter; or perhaps slightly longer than a flange diameter; employs seals made on the circular lead-in and lead-out regions which as a numerical example can be 6.4-mm diameter; this diameter turns out to be large enough to avoid excess reflection of ~100-kHz torsional waves at the seal; and torsional impedance matching achieved by gradually tapering the lead-in and lead-out portions. One way to reduce the need for so many (e.g. three) density sensors is to install some sort of static mixer upstream, such that the density of the fluid becomes so homogeneous that the error mentioned at the outset, is rendered negligibly small. If such a mixer can be tolerated by the application, then one density measurement may suffice, e.g., only along a diameter path.

A variant of FIG. 10, (not shown), would have the tilted diameter measurements made by external clamp-on transducers (not wetted transducers), and c would be measured in a separate plane which is perpendicular to the conduit. The c plane is preferably nearby and downstream of the region in which V is measured. In the end view the projections are congruent.

The torsional waveguides can be made of metal such as aluminum, 316SS, titanium, or for near-zero temperature coefficients of soundspeed, Ni-Span-C. Ceramic possibilities include fused silica, zirconia or alumina. Graphite such as Poco XT is another refractory possibility. Low density waveguides are more sensitive to fluid density than are high-density waveguides. At this stage of the discussion we do not yet introduce compensation for fluid viscosity or temperature. That is to say, we assume the torsionalmode sound speed in the noncircular waveguide is a good measure of the density of the adjacent fluid, without further compensation.

If, however, the temperature or nature of the fluid were to vary over wide ranges, then a more general waveguide solution is required, as in FIG. 10. FIG. 10 introduces into the mass flowmeter spool 50$^V$ a section of heavier wall, sufficient to install a number of waveguide sensors along quadrature paths and also in two or three parallel planes each perpendicular to the conduit axis. This allows the torsional sensor, in which sound speed is a function of ρ but also viscosity and temperature, to be compensated for these two variables. The viscosity compensator can be of tubular cross section. The T compensator can be of solid construction and could lie dry and sealed within the viscosity tube sensor. Also, each sensor section can be interrogated in p-e (pulse-echo) or t-t (through-transmission) configurations. Compensation for viscosity and temperature is described in U.S. Pat.

No. 4,893,496 or in references 5–9 in Shepard, C. L., B. J. Burghard, M. A. Friesel, B. P. Hildebrand, X., Moua, A. A. Diaz, and C. W. Enderlin., Measurements of Density and Viscosity of One- and Two-Phase Fluids with Torsional Waveguides, *IEEE UFFC*, (3), pp. 536–548 (May 1999).

The flow velocity part of the mass flowmeter spool may include inserts of oblong shape, FIGS. 12–13 and shouldered as therein illustrated, to orient them in slots milled by an end mill cutting tool oriented in a direction perpendicular to a plane of the spool containing the axis. The oblong may receive two transducers, to allow staggered v paths spaced~one or a few cm apart, each v path being interrogated in one direction only, for a fast response flowmetering.

FIGS. 12–13 are very detailed examples showing numerical values for inserts and spool showing the sound speed in the fluid measured downstream in the same quadrature planes but also in a plane perpendicular to the spoolpiece axis. There are three perpendicular p-e measurements. The inserts fit into oblong holes milled with unequal shoulders so that orientation is controlled. The inserts would typically be welded into the spoolpiece. Afterwards, compression fittings would thread into the inserts, and transducers would be installed in the compression fittings. These are examples. Other mechanical arrangements are known in the art. Note that the interactions with the fluid occur in a volume defined by planes at the ends of an inscribed cube . . . the "cube within a tube" arrangement. Advantages of this arrangement include: short axial length, easy to explain location of quadrature paths. The axial interaction length in the flowing fluid, 0.707D, is obviously less than what would be achieved if the transducers were angled at 30° or 45°. However, as a numerical example, in a 3-inch pipe, the diameter v path has a length $L \approx 2.1$ inches. When exposed to flowing air, that path generates a time difference upstream minus downstream of 2 microseconds per meter/s of flow, resolvable to one or a few tenths of a percent. As all "cube in a tube" paths have the same L, the same time difference is generated for a 1-m/s flow velocity.

Since the planes forming the upstream and downstream faces of the inscribed cube in a tube confine the flow velocity transducers to these two planes, they are a special case of the quadrature solution described in U.S. Pat. No. 4,300,401. However, for the first time, this invention combines the specific spacing that makes L=0.7071D, v paths for V, and preferably using c measured over these same quadrature paths to determine density and then mass flowrate. The measuring volume within the conduit, assuming a round conduit of inside diameter D, is then:

$$(\pi D^2/4)(D/2) = \pi D^3/4 \; 2 \sim 0.555 D^3 \tag{2}$$

Very roughly, this is $D^3/2$. This makes for a compact measuring system. The transducer penetrations or mounts are located over an axial extent typically less than the pipe outside diameter. The sharp v path is advantageous with respect to canceling crossflow, because the closer the two v-path legs are to one another, the more likely each will be exposed to the same crossflow velocity, and hence the v path can effectively cancel crossflow contributions. A wide v would not be as effective in this respect.

The T7 transducer shown in FIG. 15 is secured to the ambient-temperature end of the tubular buffer by a female nut 411, which threads onto the externally-threaded portion 413 of the tubular buffer 403. That buffer wall thickness, according to U.S. Pat. No. 5,515,733 may be as thin as 1 mm or even less, if the fluid (e.g. a binary gas or other gaseous product) is at a pressure whose maximum value never exceeds a value very close to atmospheric pressure. When the wall of the tubular buffer is this thin, collars may be added externally to further suppress crosstalk. The buffer wall would be thickened where necessary to provide radial dimensions sufficient for the mentioned threads, for strength and vibration or sag resistance, or where welding was to occur. As a numerical example, if the T7 is operated at 100 kHz, and the fluid is a gas like air, i.e., with a sound speed at room temperature near 343 m/s, and a corresponding wavelength of 3 mm, then the buffer inside diameter can be about 15 to 25 mm, 19 mm being a preferred value, depending on length. If the ratio of through-hole diameter to buffer inside diameter is 0.7071, theoretically the reference echo for so-called tw compensation (buffer delay) will be strong as it is generated using about half the energy reaching that end of the buffer which is terminated with a truncated 90° cone whose vertex coincides with the conduit interior surface. That cone in effect is a truncated corner reflector with a hole through the corner. The transit time to the cone and back has a value the same as if the reflection occurred at a plane perpendicular to the buffer axis and that plane was located at the vertex. Hence we refer to the reflector as located virtually at the vertex. This description assumes the sound speed in the gas within the truncated conical region and extending to the vertex is substantially constant. Note that the reflector's virtual location is right at the conduit interior wall and no protrusion into the flow is required to achieve this. It is believed this means of providing for tw buffer round trip delay measurement and compensation is new, for tubular buffers filled with a liquid or gas. That liquid or gas may be the same as the fluid flowing through the spoolpiece. But there can be differences under transient conditions.

The oblong inserts can be made slightly longer than shown to accommodate a pair of axially-displaced transducers, axially spaced~one or a few cm. The axially-staggered vee paths may then be represented by slightly-spaced, adjacent or somewhat-superimposed v's, symbolically VV, W or \X/, respectively.

While the illustrations in this application concentrate on the spoolpiece and transducers or sensors installed therein or externally, it will be understood that the "quadrature mass flowmeter" requires transmitting, receiving, filtering, timing and signal processing typically found, at least for the flow portion, in commercially available flowmeter instruments such as those illustrated in Brown, A., and Lynnworth, L. C., *Ultrasonic Flowmeters*, Ch. 20, pp. 515–573 in Sptizer, D. W. (Editor): *Flow Measurement—Practical Guides for Measurement Control*, pp.515–573, $2^{nd}$ Ed., ISA (September 2001), page 548. The box labeled "electronics" in FIG. 1E is really a complex electronic module of which several versions are shown in photographs on page 548 in the just-mentioned book edited by Spitzer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims.

What is claimed is:

1. A method of determining the mass flow rate of a fluid flowing in a conduit, the method comprising:

transmitting ultrasonic energy along multiple parallel quadrature planes through the fluid;

measuring the transit times of the ultrasonic energy through the fluid with and against the flow direction of the fluid;

calculating the flow velocity of the fluid in each quadrature plane based on the transit times in each quadrature plane;

determining the density of the fluid in each quadrature plane; and performing quadrature integration of the product of the fluid density and fluid velocity in each quadrature plane to calculate the total mass flow rate of the fluid.

2. The method of claim 1 in which the density is determined in each quadrature plane by calculating the speed of sound in each quadrature plane from the transit times of the ultrasonic energy through the fluid in each quadrature plane and referencing a library including speed of sound and density data for different fluids.

3. The method of claim of 1 in which the density of the fluid is determined by measuring the density of the fluid.

4. The method of claim 3 in which the density of the fluid in each quadrature plane is measured by transmitting ultrasonic energy in the quadrature planes, measuring the transit time of the ultrasonic energy in the fluid, and calculating the density of the fluid in each quadrature plane based on the transit time in each quadrature plane.

5. The method of claim 4 in which the ultrasonic energy is a torsional wave.

6. The method of claim 3 in which the density of the fluid in a first quadrature plane is measured by transmitting ultrasonic energy in the first quadrature plane, measuring the transit time of the ultrasonic energy in the fluid in the quadrature plane, calculating the density of the fluid in the first quadrature plane based on the transit time of the ultrasonic energy in the first quadrature plane, and deriving the density of the fluid in the other quadrature planes from the measured density of the fluid in the first quadrature plane.

7. The method of claim 1 in which the ultrasonic energy is transmitted across each quadrature plane and then reflected back across each quadrature plane.

8. The method of claim 1 in which the parallel quadrature planes extend horizontally.

9. The method of claim 1 further including the steps of measuring the temperature of the fluid and calculating the mass flow rate using the temperature of the fluid.

10. The method of claim 1 further including the step of measuring the pressure of the fluid and calculating the mass flow rate using the pressure of the fluid.

11. The method of claim 1 further including the step of calculating the speed of sound based on the transit time of the ultrasonic energy through the fluid and calculating the density of the fluid in each quadrature plane using the calculated speed of sound in each quadrature plane.

12. A higher accuracy quadrature mass flow meter comprising:

a first set of ultrasonic transducers aligned to transmit ultrasonic energy along parallel quadrature planes through a fluid flowing in a conduit;

a second set of ultrasonic transducers aligned in the quadrature planes to receive the ultrasonic energy transmitted by the first set;

means for determining the density of the fluid in each quadrature plane; and an electronic subsystem responsive to the ultrasonic transducers and the means for determining density, the electronic subsystem configured to calculate the flow velocity of the fluid in each quadrature plane based on the transit time of the transmitted ultrasonic energy in each quadrature plane, the electronics subsystem including a processor programmed to perform quadrature integration of the product of the fluid density and fluid velocity in each quadrature plane and to calculate the total mass flow rate of the fluid.

13. The system of claim 12 in which the means includes a memory including speed of sound and density data for different liquids and the processor is configured to:

calculate the speed of sound in each quadrature plane from the transit time of the transmitted ultrasonic energy through the fluid in each quadrature plane, and compare the calculated speed of sound in each quadrature plane with the data in the memory to determine the density of the fluid in each quadrature plane.

14. The system of claim 12 in which the means includes a third plurality of ultrasonic transducers located downstream from the second plurality of transducers also aligned with the quadrature planes and configured to transmit ultrasonic energy in the fluid.

15. The system of claim 14 in which the processor is programmed to calculate the density of the fluid in each quadrature plane based on the transit time of the ultrasonic energy in the fluid transmitted by the third plurality of transducers.

16. The system of claim 14 in which the third plurality of transducers are each configured to launch a torsional wave.

17. The system of claim 16 in which the third plurality of transducers each include a waveguide extending through the conduit.

18. The system of claim 12 in which the means includes a single ultrasonic transducer located downstream from the second plurality of transducers and aligned with a first quadrature plane and configured to transmit ultrasonic energy in the fluid in said first quadrature plane.

19. The system of claim 18 in which the processor is programmed to calculate the density of the fluid in the first quadrature plane based on the transit time of the ultrasonic energy in the fluid transmitted by the single ultrasonic transducer and to derive the density of the fluid in the other quadrature planes based on the calculated density of the fluid in the first quadrature plane.

20. The system of claim 12 in which the conduit is a spoolpiece including all of the transducers disposed therein, the spoolpiece installed between two conduit sections.

21. The system of claim 12 in which the parallel quadrature planes extend horizontally.

22. The system of claim 12 in which the first and second set of ultrasonic transducers are located on the same side of the conduit, the system further including a set of reflectors disposed on the opposite side of the conduit between the first and second set of ultrasonic transducers for redirecting ultrasonic energy from one set of transducers to the other.

23. The system of claim 12 in which the quadrature planes are perpendicular to the transverse axis of the conduit, and where the variance among sound speeds in the planes is taken as a measure of density stratification.

24. The system of claim 12 in which each ultrasonic transducer is installed in a fitting located in an insert attached to the conduit.

25. The system of claim 24 in which the insert forms a truncated cone whose vertex is coincident with intersection of the longitudinal axis of the insert and the interior wall of the conduit.

26. The system of claim 12 further including a temperature sensor for detecting the temperature of the fluid in the conduit.

27. The system of claim 12 further including a pressure sensor for detecting the pressure of the fluid in the conduit.

28. The system of claim 12 in which the first and second sets of transducers are aligned such that all of the ultrasonic energy interactions with the flowing fluid occur in a volume defined by planes at the end of a cube inscribed in the conduit.

29. A method of determining the mass flow rate of a fluid flowing in a conduit, the method comprising:

transmitting ultrasonic energy along multiple parallel quadrature planes through the fluid;

measuring the transit time of the ultrasonic energy through the fluid with and against the flow direction of the fluid;

calculating the flow velocity of the fluid in each quadrature plane based on the transit time in each quadrature plane;

determining the density of the fluid in each quadrature plane by calculating the speed of sound in each quadrature plane from the transit time of the ultrasonic energy through the fluid in each quadrature plane and referencing a library including speed of sound and density data for different fluids; and performing quadrature integration of the product of the fluid density and fluid velocity in each quadrature plane to calculate the total mass flow rate of the fluid.

30. A method of determining the mass flow rate of a density stratified fluid flowing in a conduit, the method comprising:

transmitting ultrasonic energy along multiple parallel quadrature planes through the fluid;

measuring the transit time of the ultrasonic energy through the fluid with and against the flow direction of the fluid;

calculating the flow velocity of the fluid in each quadrature plane based on the transit time in each quadrature plane;

measuring the density of the fluid in each quadrature plane; and performing quadrature integration of the product of the fluid density and fluid velocity in each quadrature plane to calculate the total mass flow rate of the fluid.

31. A higher accuracy quadrature mass flow meter comprising:

a first set of ultrasonic transducers aligned to transmit ultrasonic energy along multiple parallel quadrature planes through a fluid flowing in a conduit;

a second set of ultrasonic transducers aligned in the quadrature planes to receive the ultrasonic energy transmitted by the first set;

a memory including speed of sound and density data for different liquids; and an electronic subsystem configured to calculate the flow velocity of the fluid in each quadrature plane based on the transit time of the transmitted ultrasonic energy in each quadrature plane, the electronics subsystem including a processor programmed to calculate the speed of sound in each quadrature plane from the transit time of the transmitted ultrasonic energy through the fluid in each quadrature plane, compare the calculated speed of sound in each quadrature plane with the data in the memory to determine the density of the fluid in each quadrature plane, and to perform quadrature integration of the product of the fluid density and fluid velocity in each quadrature plane and to calculate the total mass flow rate of the fluid.

32. A higher accuracy quadrature mass flow meter comprising:

a first set of ultrasonic transducers aligned to transmit ultrasonic energy along three or more parallel quadrature planes through a fluid flowing in a conduit;

a second set of ultrasonic transducers aligned in the quadrature planes to receive the ultrasonic energy transmitted by the first set;

a third plurality of ultrasonic transducers located downstream from the second plurality of transducers also aligned with the quadrature planes and configured to transmit ultrasonic energy in the fluid; and an electronic subsystem configured to calculate the flow velocity of the fluid in each quadrature plane based the first and second set of transducers, to calculate the density of the fluid in each quadrature plane based on the third plurality of transducers, and to perform quadrature integration of the product of the fluid density and fluid velocity in each quadrature plane and to calculate the total mass flow rate of the fluid.

33. A higher accuracy quadrature mass flow meter comprising:

a first set of ultrasonic transducers aligned to transmit ultrasonic energy along multiple paths in three or more parallel quadrature planes through a fluid flowing in a conduit;

a second set of ultrasonic transducers aligned in the quadrature planes to receive the ultrasonic energy transmitted by the first set;

at least one ultrasonic transducer located downstream from the second plurality of transducers and aligned with a first quadrature plane and configured to transmit ultrasonic energy in the fluid in said first quadrature plane; and an electronic subsystem configured to calculate the flow velocity of the fluid in each quadrature plane based on the first and second set of transducers, to calculate density of the fluid in each quadrature plane based on the said at least one ultrasonic transducer, and to perform quadrature integration of the product of the fluid density and fluid velocity in each quadrature plane and to calculate the total mass flow rate of the fluid.

* * * * *

UNITED STATES PATENT AND TRADEMARK OFFICE
CERTIFICATE OF CORRECTION

PATENT NO. : 6,732,595 B2
DATED : May 11, 2004
INVENTOR(S) : Lawrence C. Lynnworth It is certified that error appears in the above-identified patent and that said Letters Patent is hereby corrected as shown below:

Column 1,
Line 36, "calculate the volumetric flow rate Q. if density were" should read -- calculate the volumetric flow rate Q. If density were --;

Column 2,
Lines 24-25, "having non-uniform density distributions is effected by not by taking the product of the average fluid density and the" should read -- having non-uniform density distributions is effected not by taking the product of the average fluid density and.the --;
Line 34, "uniform, or b) eliminates the errors associate with multiply-" should read -- uniform, or b) elimiates the errors associated with multiply- --;

Column 4,
Line 19, "is coincident with intersection of the longitudinal axis of the" should read -- is coincident with the intersection of the longitudinal axis of the --;

Column 8,
Line 40, "pp109-116 (1940). For Liquid hydrocarbons, $\Delta c/c \approx 3\Delta\rho/\rho$," should read -- pp. 109-116 (1940). For liquid hydrocarbons, $\Delta c/c \approx 3\Delta\rho/\rho$, --;
Line 52, "Quadrature integration of $\rho_1 V_1$ etc. proceeds as discussed" should read -- : "Quadrature integration of $\rho_1 V_1$ etc. proceeds as discussed --;

Column 10,
Line 48, "exactly a the pipe interior point 412. This pattern generates" should read -- exactly at the pipe interior point 412. This pattern generates --;

Column 11,
Line 54, "$V_1$ and for the $\rho_1$ are typically the same or coincident when" should read -- $V_1$ and the $\rho_1$ are typically the same or coincident when --;
Line 56, "corresponding $\rho_1$ and $V_1$ paths lie in parallel planes tangent" should read -- corresponding $\rho_1$ and $V_1$ paths lie in parallel planes tangent --;
Line 61, "The flow velocities $V_1$ are typically determined by prior" should read -- The flow velocities $V_1$ typically determined by prior --;
Line 62, "art methods of contrapropagation. The densities $\rho_1$ are" should read -- art methods of contrapropagation. The densities $\rho_1$ are --;
Line 64, "or congruent with projected paths used for determining $V_1$." should read -- or congruent with projected paths used for determining $V_1$. --;
Line 65, "For example, one or more of the $c_1$ can be determined in a" should read -- For example, one or more of the $c_1$ can be determined in a --;

UNITED STATES PATENT AND TRADEMARK OFFICE
CERTIFICATE OF CORRECTION

PATENT NO. : 6,732,595 B2
DATED : May 11, 2004
INVENTOR(S) : Lawrence C. Lynnworth It is certified that error appears in the above-identified patent and that said Letters Patent is hereby corrected as shown below:

Column 12,
Line 1, "both $\rho_1$ and $V_1$ are hardly influenced by pressure P. In such" should read -- both $\rho_1$ and $V_1$ are hardly influenced by pressure P. In such --;
Line 12, "usually only when the relation between $\rho_1$ and $c_1$ has an" should read -- usually only when the relation between $\rho_1$ and $c_1$ has an --;

Column 14,
Line 49, "temperature. That is to say, we assume the torsionalmode" should read -- temperature. That is to say, we assume the torsional-mode --;

Column 16,
Line 35, "staggered vee paths may then be represented by slightly-" should read -- staggered v paths may then be represented by slightly- --; and Column 20,
Line 26, "velocity of the fluid in each quadrature plane based the" should read -- velocity of the fluid in each quadrature plane based on the --.

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,732,595 B2
DATED : May 11, 2004
INVENTOR(S) : Lawrence C. Lynnworth It is certified that error appears in the above-identified patent and that said Letters Patent is hereby corrected as shown below:

Column 2,
Line 34, "uniform, or b) elimiates the errors associated with multiply-" should read -- uniform, or b) eliminates the errors associated with multiply- --;

Column 8,
Line 52, "Quadrature integration of $\rho_1 V_1$ etc. proceeds as discussed" should read -- : "Quadrature integration of $\rho_1 V_1$ etc. proceeds as discussed --;

Column 11,
Line 54, "$V_1$ and for the $\rho_1$ are typically the same or coincident when" should read -- $V_1$ and the $\rho_1$ are typically the same or coincident when --;
Line 56, "corresponding $\rho_i$ and $V_1$ paths lie in parallel planes tangent" should read -- corresponding $\rho_i$ and $V_i$ paths lie in parallel planes tangent --;
Line 61, "The flow velocities $V_1$ typically determined by prior" should read -- The flow velocities $V_i$ typically determined by prior --;
Line 62, "art methods of contrapropagation. The densities $\rho_1$ are" should read -- art methods of contrapropagation. The densities $\rho_i$ are --;
Line 64, "or congruent with projected paths used for determining $V_1$." should read -- or congruent with projected paths used for determining $V_i$. --;
Line 65, "For example, one or more of the $c_1$ can be determined in a" should read -- For example, one or more of the $c_i$ can be determined in a --;

UNITED STATES PATENT AND TRADEMARK OFFICE
CERTIFICATE OF CORRECTION

PATENT NO. : 6,732,595 B2
DATED : May 11, 2004
INVENTOR(S) : Lawrence C. Lynnworth It is certified that error appears in the above-identified patent and that said Letters Patent is hereby corrected as shown below:

<u>Column 12,</u>
Line 1, "both $\rho_1$ and $V_1$ are hardly influenced by pressure P. In such" should read -- both $\rho_i$ and $V_i$ are hardly influenced by pressure P. In such --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,732,595 B2 |
| APPLICATION NO. | : 10/260331 |
| DATED | : May 11, 2004 |
| INVENTOR(S) | : Lawrence C. Lynnworth |

It is certified that error appears in the above-identified patent and that said Letters Patent is hereby corrected as shown below:

Column 8, line 52: "Quadrature integration of $\rho_1 V_1$ etc. proceeds as discussed" should read: --Quadrature integration of $\rho_i V_i$ etc. proceeds as discussed--;

Column 11, line 54: "$V_1$ and the $\rho_1$ are typically the same or coincident when" should read --$V_i$ and the $\rho_i$ are typically the same or coincident when--.

Signed and Sealed this

Seventh Day of November, 2006

JON W. DUDAS
*Director of the United States Patent and Trademark Office*